United States Patent
Yang et al.

(10) Patent No.: US 11,902,674 B2
(45) Date of Patent: Feb. 13, 2024

(54) IMAGE ACQUISITION METHOD, CAMERA ASSEMBLY, AND MOBILE TERMINAL

(71) Applicant: GUANGDONG OPPO MOBILE TELECOMMUNICATIONS CORP., LTD., Guangdong (CN)

(72) Inventors: Xin Yang, Guangdong (CN); Xiaotao Li, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 18/148,229

(22) Filed: Dec. 29, 2022

(65) Prior Publication Data
US 2023/0140516 A1    May 4, 2023

Related U.S. Application Data

(63) Continuation of application No. PCT/CN2020/119956, filed on Oct. 9, 2020.

(30) Foreign Application Priority Data

Jul. 8, 2020 (CN) .......................... 202010650778.2

(51) Int. Cl.
*H04N 23/84*       (2023.01)
*H04N 25/702*      (2023.01)
(Continued)

(52) U.S. Cl.
CPC ............ *H04N 23/84* (2023.01); *H04N 23/81* (2023.01); *H04N 25/702* (2023.01); *H04N 25/77* (2023.01)

(58) Field of Classification Search
None
See application file for complete search history.

(56) References Cited

U.S. PATENT DOCUMENTS

2008/0130991 A1   6/2008   O'Brien et al.
2010/0309350 A1   12/2010  Adams, Jr. et al.
(Continued)

FOREIGN PATENT DOCUMENTS

CN   101233763 A   7/2008
CN   102365861 A   2/2012
(Continued)

OTHER PUBLICATIONS

WIPO, International Search Report for PCT Application No. PCT/CN2020/119956, dated Apr. 9, 2021.
(Continued)

*Primary Examiner* — James M Hannett
(74) *Attorney, Agent, or Firm* — Hodgson Russ LLP

(57) ABSTRACT

An image acquisition method, a camera assembly, and a mobile terminal are provided. The image acquisition method includes: acquiring a first color original image and a second color original image by exposing the pixel array, each piece of first color original image data in the first color original image being generated by at least one color photosensitive pixel in a sub-unit, and each piece of second color original image data in the second color original image being generated by at least one transparent photosensitive pixel and at least one color photosensitive pixel in the sub-unit; and fusing the first color original image and the second color original image to acquire a target image.

20 Claims, 7 Drawing Sheets

(51) Int. Cl.
*H04N 23/81* (2023.01)
*H04N 25/77* (2023.01)

(56) References Cited

U.S. PATENT DOCUMENTS

| | | | |
|---|---|---|---|
| 2012/0274651 A1* | 11/2012 | Hass | G06T 11/00 |
| | | | 345/589 |
| 2012/0300105 A1 | 11/2012 | Deever et al. | |
| 2013/0141522 A1* | 6/2013 | McClatchie | H04N 23/45 |
| | | | 348/36 |
| 2014/0253766 A1 | 9/2014 | Kiyota | |
| 2015/0146067 A1 | 5/2015 | Roh et al. | |
| 2015/0264325 A1 | 9/2015 | Hirota | |

FOREIGN PATENT DOCUMENTS

| | | |
|---|---|---|
| CN | 103765876 A | 4/2014 |
| CN | 102891969 B | 12/2017 |
| CN | 111080534 A | 4/2020 |
| CN | 111246064 A | 6/2020 |
| CN | 111711755 A | 9/2020 |

OTHER PUBLICATIONS

CNIPA, Priority Examination for CN Application No. 202010650778.2, dated Nov. 25, 2020.
CNIPA, First Office Action for CN Application No. 202010650778.2, dated Dec. 18, 2020.
CNIPA, Office Action issued for CN Application No. 202010650778.2, dated Mar. 16, 2021.
EPO, Extended European Search Report for EP Application No. 20943968.6, dated Oct. 10, 2023.

* cited by examiner

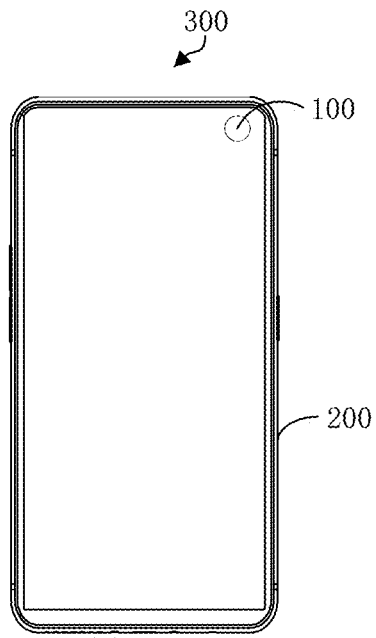

FIG. 20 exposing a pixel array to acquire a first color original image and a second color original image, where the first color original image is composed of multiple pieces of first color original image data, each of the multiple pieces of first color original image data is generated by the at least one color photosensitive pixel of the sub-unit, the second color original image is composed of multiple pieces of second color original image data, and each of the multiple pieces of second color original image data is generated by the at least one transparent photosensitive pixel and the at least one color photosensitive pixel of the sub-unit — 01 fusing the first color original image and the second color original image to acquire a target image — 02

FIG. 21

IMAGE ACQUISITION METHOD, CAMERA ASSEMBLY, AND MOBILE TERMINAL

CROSS-REFERENCE TO RELATED APPLICATIONS

The application is a continuation of International Application No. PCT/CN2020/119956, filed Oct. 9, 2020, which claims priority to Chinese Patent Application No. 202010650778.2, filed Jul. 8, 2020. The entire disclosures of the above-identified applications are incorporated herein by reference.

TECHNICAL FIELD

The disclosure relates to the field of imaging technologies, and more particularly to an image acquisition method, a camera assembly, and a mobile terminal.

BACKGROUND

A camera may be installed in an electronic device such as a mobile phone, enabling the electronic device with an image acquisition function. The camera may be provided with a color filter array therein to acquire a color image.

SUMMARY

Embodiments of the disclosure provide an image acquisition method, a camera assembly, and a mobile terminal.

According to the embodiments of the disclosure, the image acquisition method is performed by an image sensor. The image sensor includes a pixel array including multiple sub-units, each of the multiple sub-units includes at least one transparent photosensitive pixel and at least one color photosensitive pixel, and the color photosensitive pixel has a narrower spectral response range than the transparent photosensitive pixel. The image acquisition method includes operations as follows. A first color original image and a second color original image are acquired by exposing the pixel array, the first color original image is composed of multiple pieces of first color original image data, each of the multiple pieces of first color original image data is generated by the at least one color photosensitive pixel of the sub-unit, the second color original image is composed of multiple pieces of second color original image data, and each of the multiple pieces of second color original image data is generated by the at least one transparent photosensitive pixel and the at least one color photosensitive pixel of the sub-unit; and the first color original image and the second color original image are fused to acquire a target image.

According to the embodiments of the disclosure, the camera assembly includes an image sensor and a processor. The image sensor includes a pixel array including multiple sub-units, each of the multiple sub-units includes at least one transparent photosensitive pixel and at least one color photosensitive pixel, and the color photosensitive pixel has a narrower spectral response range than the transparent photosensitive pixel. The pixel array is exposed to acquire a first color original image and a second color original image are acquired, where the first color original image is composed of multiple pieces of first color original image data, each of the multiple pieces of first color original image data is generated by the at least one color photosensitive pixel of the sub-unit, the second color original image is composed of multiple pieces of second color original image data, and each of the multiple pieces of second color original image data is generated by the at least one transparent photosensitive pixel and the at least one color photosensitive pixel of the sub-unit. The processor is configured to fuse the first color original image and the second color original image to thereby acquire a target image.

According to the embodiments of the disclosure, the mobile terminal includes a housing and a camera assembly. The camera assembly is combined with the housing. The camera assembly includes an image sensor and a processor. The image sensor includes a pixel array including multiple sub-units, each of the multiple sub-units includes at least one transparent photosensitive pixel and at least one color photosensitive pixel, and the color photosensitive pixel has a narrower spectral response range than the transparent photosensitive pixel. The pixel array is exposed to acquire a first color original image and a second color original image are acquired, where the first color original image is composed of multiple pieces of first color original image data, each of the multiple pieces of first color original image data is generated by the at least one color photosensitive pixel of the sub-unit, the second color original image is composed of multiple pieces of second color original image data, and each of the multiple pieces of second color original image data is generated by the at least one transparent photosensitive pixel and the at least one color photosensitive pixel of the sub-unit. The processor is configured to fuse the first color original image and the second color original image to thereby acquire a target image.

Additional aspects and advantages of the disclosure will be given in part in the following description, and become apparent in part from the following descriptions, or be learned from the practice of the disclosure.

BRIEF DESCRIPTION OF THE DRAWINGS

The above and/or additional aspects and advantages of the disclosure will become more apparent and easily understood from the following description of the embodiments in conjunction with the drawings, in which:

FIG. 20 is a schematic structural diagram illustrating a mobile terminal according to some embodiments of the disclosure; and FIG. 21 is a schematic flowchart illustrating an image acquisition method according to some embodiments of the disclosure.

DETAILED DESCRIPTION

Figure 1:
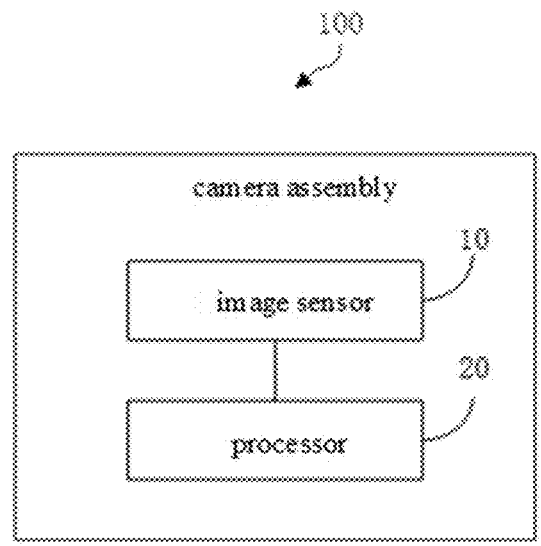
FIG. 1 is a schematic diagram illustrating a camera assembly according to some embodiments of the disclosure.

The embodiments of the disclosure will be described in detail below. The examples of the embodiments are shown in the drawings, where same or similar references indicate, throughout the drawings, same or similar elements or elements having same or similar functions. The embodiments described with reference to the drawings are exemplary and only used for explaining the disclosure, and should not be construed as limitations to the disclosure.

Referring to FIGS. 1, 2, 5 and 21, an image acquisition method according to some embodiments of the disclosure is performed by a sensor 10. The image sensor 10 includes a pixel array 11, the pixel array 11 includes multiple sub-units, each sub-unit includes at least one transparent photosensitive pixel W and at least one color photosensitive pixel, and the color photosensitive pixel has a narrower spectral response range than the transparent photosensitive pixel W.

The image acquisition method includes operations as follows.

At 01: exposing a pixel array 11 to acquire a first color original image and a second color original image, in which the first color original image is composed of multiple pieces of first color original image data, each of the multiple pieces of first color original image data is generated by the at least one color photosensitive pixel of the sub-unit, the second color original image is composed of multiple pieces of second color original image data, and each of the multiple pieces of second color original image data is generated by the at least one transparent photosensitive pixel W and the at least one color photosensitive pixel of the sub-unit.

At 02, fusing the first color original image and the second color original image to acquire a target image.

In some embodiments, the image acquisition method further includes: filtering the first color original image to acquire a first color filtered image, in which the first color filtered image is composed of multiple pieces of first color filtered image data; and filtering the second color original image to acquire a second color filtered image, in which the second color filtered image is composed of multiple pieces of second color filtered image data. The operation 02 of fusing the first color original image and the second color original image to acquire the target image, includes: fusing the first color filtered image and the second color filtered image to acquire the target image.

Figure 17:
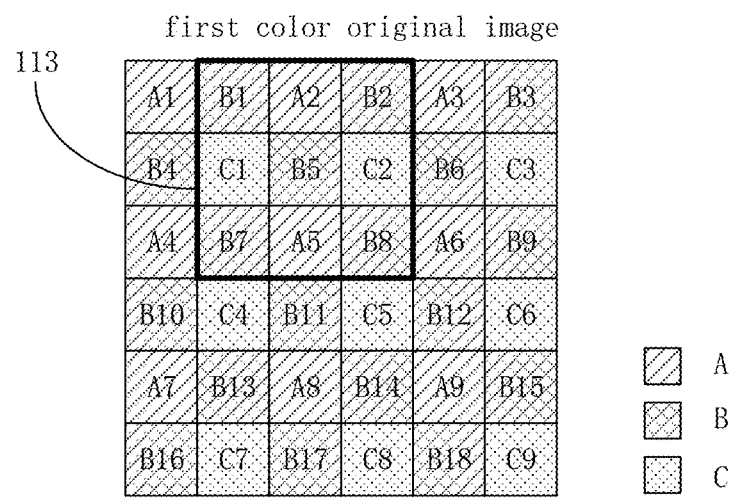
FIGS. 17 and 18 are schematic diagrams illustrating principles of filtering the first color original image according to some embodiments of the disclosure.

Referring to FIG. 17, in some embodiments, the operation of filtering the first color original image to acquire the first color filtered image includes operations as follows. A first to-be-filtered pixel in the first color original image is determined, and a first reference area 113 in the first color image is determined, and the first to-be-filtered pixel is located in the first reference area 113. For each of multiple first reference pixels in the first reference area 113, a weight for the first reference pixel relative to the first to-be-filtered pixel is calculated, in which the multiple first reference pixels have a same color channel as the first to-be-filtered pixel, and the weight includes a weight in a spatial domain and a weight in a range domain. According to the multiple pieces of first color original image data of the multiple first reference pixels and the weights for the multiple first reference pixels, the first color original image data of the first to-be-filtered pixel is corrected to acquire one of the multiple pieces of first color filtered image data; and each pixel in the first color original image is traversed to acquire the multiple pieces of first color filtered image data.

In some embodiments, the operation of filtering the second color original image to acquire the second color filtered image includes operations as follows. A second to-be-filtered pixel in the second color original image is determined; a second reference area in the second color image is determined, in which the second to-be-filtered pixel is located in the second reference area. For each of multiple second reference pixels in the second reference area, a weight for the second reference pixel relative to the second to-be-filtered pixel is calculated, in which the multiple second reference pixels have a same color channel as the second to-be-filtered pixel, and the weight includes a weight in the spatial domain and a weight in the range domain. According to the multiple second color original image data of the multiple second reference pixels and the weights for the multiple second reference pixels, the second color original image data of the second to-be-filtered pixel is calculated to acquire one of the multiple pieces of second color filtered image data; and each pixel in the second color original image is traversed to acquire the multiple pieces of second color filtered image data.

Figure 19:
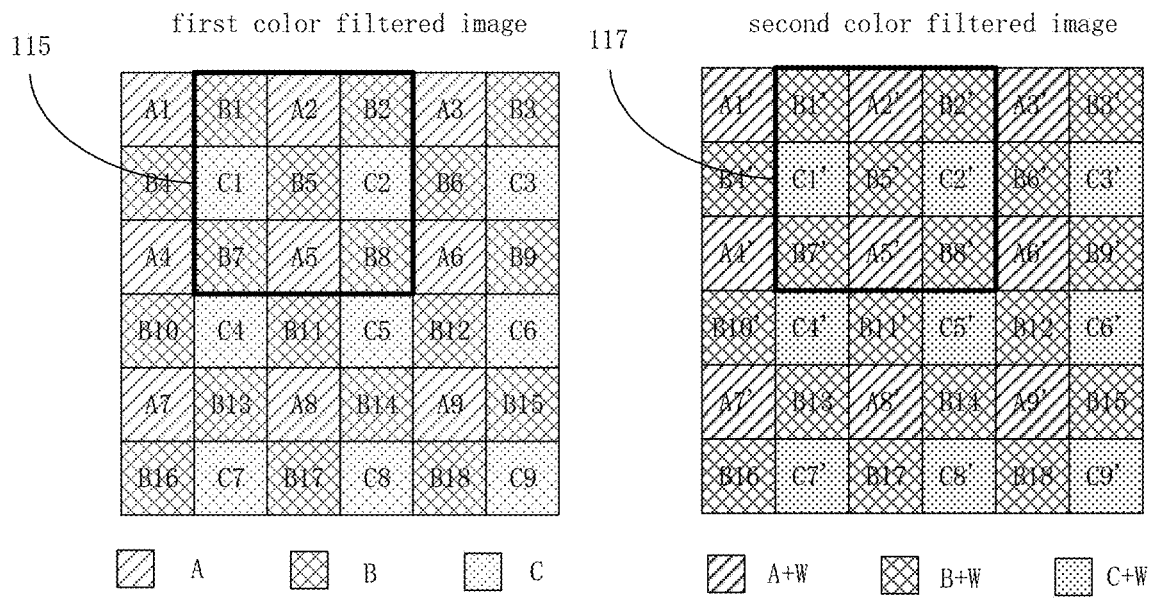
FIG. 19 is a schematic diagram illustrating principles of fusing a first color filtered image and a second color filtered image according to some embodiments of the disclosure.

Referring to FIG. 19, in some embodiments, the operation of fusing the first color original image and the second color original image to acquire the target image includes operations as follows. A first to-be-fused pixel in the first color filtered image and a second to-be-fused pixel in the second color filtered image are determined, in which a position of the first to-be-fused pixel in the first color filtered image corresponds to a position of the second to-be-fused pixel in the second color filtered image. A first selected area 115 in the first color filtered image and a second selected area 117 in the second color filtered image are determined, in which the first to-be-fused pixel is located in the first selected area 115, and the second to-be fused pixel is located in the second selected area 117. A weighted sum of the multiple pieces of first color filtered image data of multiple first selected pixels in the first selected area 115 are calculated to acquire first color fused image data, a weighted sum of the multiple pieces of second color filtered image data of multiple second selected pixels in the second selected area 117 are calculated to acquire second color fused image data, in which the multiple first selected pixels have a same color channel as the first to-be-fused pixel, and the multiple second selected pixels have a same color channel as the second to-be-fused pixel. A piece of color target image data of the first to-be-fused pixel is calculated, according to the second color filtered image data, the first color fused image data, and the second color fused image data of the second to-be-fused pixel; and each pixel in the first color filtered image is traversed to acquire multiple pieces of the color target image data, in which the multiple pieces of color target image data compose the target image.

Figure 13:
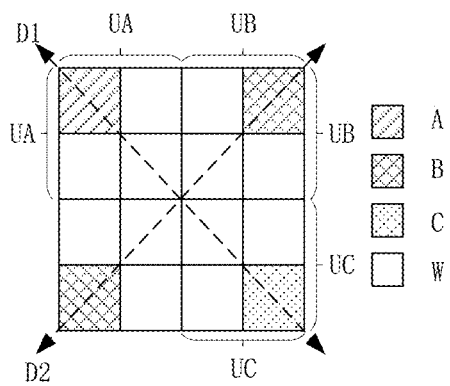

Referring to FIG. 13, in some embodiments, when each of the multiple the sub-unit includes one the color photosensitive pixel, a sum or an average of an electrical signal generated by the color photosensitive pixel after receiving light is taken as a piece of the first color original image data.

Figure 5:
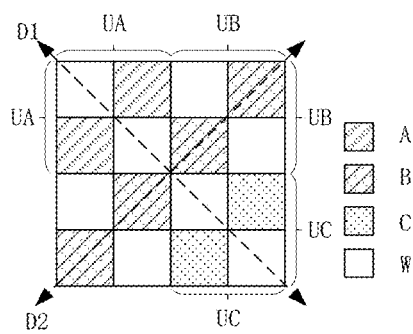
FIGS. 5 to 15 are schematic diagrams illustrating respective pixel arrangements of a minimum repeating unit in a pixel array according to some embodiment of the disclosure.

Referring to FIG. 5, in some embodiments, when each of the multiple the sub-unit includes multiple the color photosensitive pixels, a sum or an average of multiple electrical signals generated by the multiple color photosensitive pixels after receiving light is taken as a piece of the first color original image data.

Figure 14:
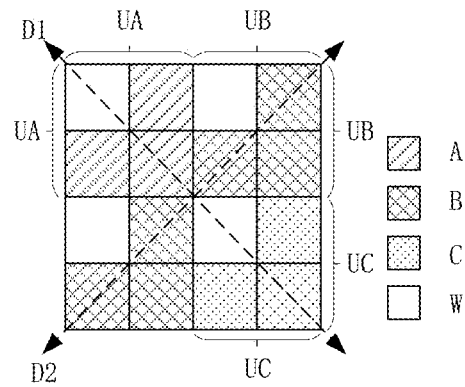

Referring to FIG. 14, in some embodiments, when each sub-unit includes one the transparent photosensitive pixel W, a sum or an average of an electrical signal generated by the transparent photosensitive pixel W after receiving light and all electrical signal generated by all the color photosensitive pixel in the sub-unit after receiving light is taken as a piece of the second color original image data.

Referring to FIG. 5, in some embodiments, when each sub-unit includes multiple the transparent photosensitive pixels W, a sum or an average of multiple electrical signals generated by the multiple transparent photosensitive pixels W after receiving light and all electrical signal generated by all the color photosensitive pixel in the sub-unit after receiving light is taken as a piece of the second color original image data.

Figure 2:
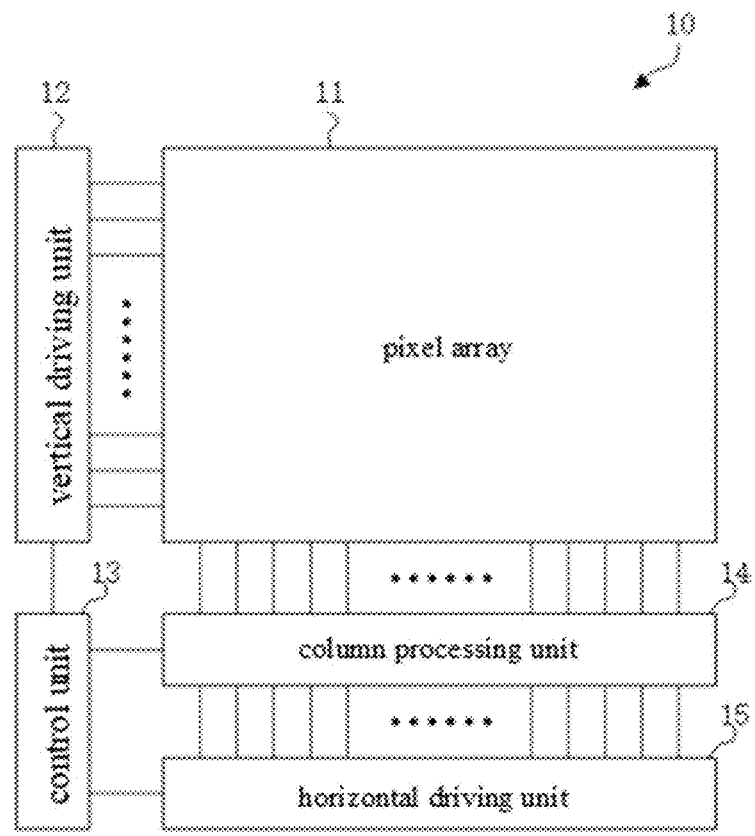
FIG. 2 is a schematic diagram illustrating a pixel array according to some embodiments of the disclosure.

Referring to FIGS. 1, 2 and 5, the disclosure provides a camera assembly 100. The camera assembly 100 includes an image sensor 10 and a processor 20. The image sensor 10 includes a pixel array 11, the pixel array 11 includes multiple sub-units, each sub-unit includes at least one transparent photosensitive pixel W and at least one color photosensitive pixel, and the color photosensitive pixel has a narrower spectral response range than the transparent photosensitive pixel W. The pixel array 11 is exposed to acquire a first color original image and a second color original image. Specifically, the first color original image is composed of multiple pieces of first color original image data, each piece of the first color original image data is generated by the at least one color photosensitive pixel of the sub-unit, the second color original image is composed of multiple pieces of second color original image data, and each piece of the second color original image data is generated by the at least one transparent photosensitive pixel W and the at least one color photosensitive pixel of the sub-unit. The processor 20 is electrically connected to the image sensor 10. The processor 20 is configured to fuse the first color original image and the second color original image to thereby acquire a target image.

Referring to FIG. 1, in some embodiments, the processor 20 is further configured to filter the first color original image to acquire the first color filtered image, in which the first color filtered image is composed of multiple pieces of first color filtered image data; and filter the second color original image to acquire a second color filtered image, in which the second color filtered image is composed of multiple pieces of second color filtered image data; and fuse the first color filtered image and the second color filtered image to acquire the target image.

In some embodiments, the processor 20 is further configured to determine a first to-be-filtered pixel in the first color original image; determine a first reference area in the first color original image, in which the first to-be-filtered pixel is located in the first reference area; calculate, for each of multiple first reference pixels in the first reference area, a weight for In some embodiments, the processor 20 is further configured to determine a second to-be-filtered pixel in the second color original image; determine a second reference area in the second color original image, in which the second to-be-filtered pixel is located in the second reference area; calculating, for each of multiple second reference pixels in the second reference area, a weight for the second reference pixel relative to the second to-be-filtered pixel, in which the multiple second reference pixels have a same color channel as the second to-be-filtered pixel, and each weight includes a weight in the spatial domain and a weight in the range domain; correct, according to the multiple pieces of second color original image data of the multiple second reference pixels and the weights for the multiple second reference pixels, the second color original image data of the second to-be-filtered pixel to acquire the second color filtered image data; and traverse each pixel in the second color original image to acquire the multiple pieces of second color filtered image data.

In some embodiments, the processor 20 is further configured to determine a first to-be-fused pixel in the first color filtered image and a second to-be-fused pixel in the second color filtered image, in which a position of the first to-be-fused pixel in the first color filtered image corresponds to a position of the second to-be-fused pixel in the second color filtered image; determine a first selected area in the first color filtered image and a second selected area in the second color filtered image, in which the first to-be-fused pixel is located in the first selected area, the second to-be fused pixel is located in the second selected area; calculate a weighted sum of the multiple pieces of first color filtered image data of multiple first selected pixels in the first selected area to acquire first color fused image data, calculate a weighted sum of the second color filtered image data of multiple pieces of second selected pixels in the second selected area to acquire second color fused image data, in which the multiple first selected pixels have a same color channel as the first to-be-fused pixel, and the multiple second selected pixels have a same color channel as the second to-be-fused pixel; calculate a piece of color target image data of the first to-be-fused pixel, according to the second color filtered image data, the first color fused image data, and the second color fused image data of the second to-be-fused pixel; and traverse each pixel in the first color filtered image to acquire multiple pieces of the color target image data, in which the multiple pieces of color target image data compose the target image.

Referring to FIG. 13, in some embodiments, when each of the multiple the sub-unit includes one the color photosensitive pixel, an electrical signal generated by the color photosensitive pixel after receiving light is taken as a piece of the first color original image data.

Referring to FIG. 5, in some embodiments, when each of the multiple the sub-unit includes multiple the color photosensitive pixels, a sum or an average of multiple electrical signals generated by the multiple color photosensitive pixels after receiving light is taken as a piece of the first color original image data;

Referring to FIG. 14, in some embodiments, when each sub-unit includes one the transparent photosensitive pixel W, a sum or an average of an electrical signal generated by the transparent photosensitive pixel W after receiving light and all electrical signal generated by all the color photosensitive pixel in the sub-unit after receiving light is taken as a piece of the second color original image data.

Referring to FIG. 5, in some embodiments, when each sub-unit includes multiple transparent photosensitive pixels W, a sum or an average of multiple electrical signals generated by the multiple transparent photosensitive pixels W after receiving light and all electrical signal generated by all the color photosensitive pixel in the sub-unit after receiving light is taken as a piece of the second color original image data.

Referring to FIG. 20, the embodiments of the disclosure further provide a mobile terminal 300. The mobile terminal 300 includes a camera assembly 100 and a housing 200. The camera assembly 100 includes an image sensor 10 and a processor 20. The image sensor 10 includes a pixel array 11, the pixel array 11 includes multiple sub-units, each sub-unit includes the at least one transparent photosensitive pixel W and the at least one color photosensitive pixel, and the color photosensitive pixel has a narrower spectral response range than the transparent photosensitive pixel W. The pixel array 11 is exposed to acquire a first color original image and a second color original image, the first color original image is composed of multiple pieces of first color original image data, each piece of the first color original image data is generated by the at least one color photosensitive pixel of the sub-unit, the second color original image is composed of multiple pieces of second color original image data, and each piece of the second color original image data is generated by the at least one transparent photosensitive pixel W and the at least one color photosensitive pixel of the sub-unit. The processor 20 is electrically connected to the image sensor 10. The processor is configured to fuse the first color original image and the second color original image to thereby acquire a target image.

Referring to FIG. 1, in some embodiments, the processor 20 is further configured to filter the first color original image to acquire the first color filtered image, in which the first color filtered image is composed of multiple pieces of first color filtered image data; and filter the second color original image to acquire a second color filtered image, in which the second color filtered image is composed of multiple pieces of second color filtered image data; and fuse the first color filtered image and the second color filtered image to acquire the target image.

In some embodiments, the processor 20 is further configured to determine a first to-be-filtered pixel in the first color original image; determine a first reference area in the first color original image, in which the first to-be-filtered pixel is located in the first reference area; calculate, for each of multiple first reference pixels in the first reference area, a weight for the first reference pixel relative to the first to-be-filtered pixel, in which the multiple first reference pixels have a same color channel as the first to-be-filtered pixel, and the weight includes a weight in a spatial domain and a weight in a range domain; correct, according to the first color original image data of the multiple first reference pixels and the weights for the multiple first reference pixels, the first color original image data of the first to-be-filtered pixel to acquire one of the multiple pieces of first color filtered image data; and traverse each pixel in the first color original image to acquire the multiple pieces of first color filtered image data.

In some embodiments, the processor 20 is further configured to determine a second to-be-filtered pixel in the second color original image; determine a second reference area in the second color original image, in which the second to-be-filtered pixel is located in the second reference area; calculate, for each of multiple second reference pixels in the second reference area, a weight for the second reference pixel relative to the second to-be-filtered pixel, in which the multiple second reference pixels have a same color channel as the second to-be-filtered pixel, and the weight includes a weight in the spatial domain and a weight in the range domain; correct, according to the second color original image data of the multiple second reference pixels and the weights for the multiple second reference pixels, the second color original image data of the second to-be-filtered pixel to acquire one of the multiple pieces of second color filtered image data; and traverse each pixel in the second color original image to acquire the multiple pieces of second color filtered image data.

In some embodiments, the processor 20 is further configured to determine a first to-be-fused pixel in the first color filtered image and a second to-be-fused pixel in the second color filtered image, in which a position of the first to-be-fused pixel in the first color filtered image corresponds to a position of the second to-be-fused pixel in the second color filtered image; determine a first selected area in the first color filtered image and a second selected area in the second color filtered image, in which the first to-be-fused pixel is located in the first selected area, the second to-be fused pixel is located in the second selected area; calculate a weighted sum of the first color filtered image data of multiple first selected pixels in the first selected area to acquire first color fused image data, calculate a weighted sum of the multiple pieces of second color filtered image data of multiple second selected pixels in the second selected area to acquire a piece of second color fused image data, in which the multiple first selected pixels have a same color channel as the first to-be-fused pixel, and the multiple second selected pixels have a same color channel as the second to-be-fused pixel; calculate a piece of color target image data of the first to-be-fused pixel, according to the second color filtered image data, the first color fused image data, and the second color fused image data of the second to-be-fused pixel; and traverse each pixel in the first color filtered image to acquire multiple pieces of the color target image data, in which the multiple pieces of color target image data compose the target image.

Referring to FIG. 13, in some embodiments, when each of the multiple the sub-unit includes one the color photosensitive pixel, an electrical signal generated by the color photosensitive pixel after receiving light is taken as a piece of the first color original image data;

Referring to FIG. 5, in some embodiments, when each of the multiple the sub-unit includes multiple the color photosensitive pixels, a sum or an average of multiple electrical signals generated by the multiple color photosensitive pixels after receiving light are taken as a piece of the first color original image data;

Referring to FIG. 14, in some embodiments, when each sub-unit includes one the transparent photosensitive pixel W, a sum or an average of an electrical signal generated by the transparent photosensitive pixel W after receiving light and all electrical signal generated by all the color photosensitive pixel in the sub-unit after receiving light is taken as a piece of the second color original image data.

Referring to FIG. 5, in some embodiments, when each sub-unit includes multiple the transparent photosensitive pixels W, a sum or an average of electrical signals generated by the multiple transparent photosensitive pixels W after receiving light and all electrical signal generated by all the color photosensitive pixel in the sub-unit after receiving light is taken as a piece of the second color original image data.

In the related art, the color filter array in the camera is usually in the form of a Bayer array. Each color filter in a Bayer color filter array allows only single-color light to pass through, so that most of the light will be filtered out, which affects a quality of the image acquired by the camera.

For the above reasons, referring to FIGS. 1, 2 and 5, the disclosure provides a camera assembly 100. The camera assembly 100 includes an image sensor 10 and a processor 20. The image sensor 10 includes a pixel array 11, the pixel array 11 includes multiple sub-units, each sub-unit includes at least one transparent photosensitive pixel W and at least one color photosensitive pixel, and the color photosensitive pixel has a narrower spectral response range than the transparent photosensitive pixel W. The pixel array 11 is exposed to acquire a first color original image and a second color original image, the first color original image is composed of multiple pieces of first color original image data, each piece of the first color original image data is generated by the at least one color photosensitive pixel of the sub-unit, the second color original image is composed of multiple pieces of second color original image data, and each piece of the second color original image data is generated by the at least one transparent photosensitive pixel W and the at least one color photosensitive pixel of the sub-unit. The processor 20 is electrically connected to the image sensor 10. The processor 20 is configured to fuse the first color original image and the second color original image to thereby acquire a target image.

The camera assembly 100 according to embodiments of the disclosure obtains, by exposing the pixel array 11, the first color original image including image data of only a monochromatic color channel and the second color original image including image data of both the monochromatic color channel and a panchromatic color channel, i.e., a transparent color channel, and fuses the first color original image and the second color original image to improve the signal-to-noise ratio and the clarity of the image, so that the quality of the image taken in the dark environment can be improved.

The camera assembly 100 according to the embodiments of the disclosure will be described in detail below with reference to the drawings.

Referring to FIG. 2, the image sensor 10 includes a pixel array 11, a vertical driving unit 12 a control unit 13, a column processing unit 14 and a horizontal driving unit 15.

For example, the image sensor 10 may be adopted with a complementary metal oxide semiconductor (CMOS) photosensitive element or a charge-coupled device (CCD) photosensitive element.

Figure 3:
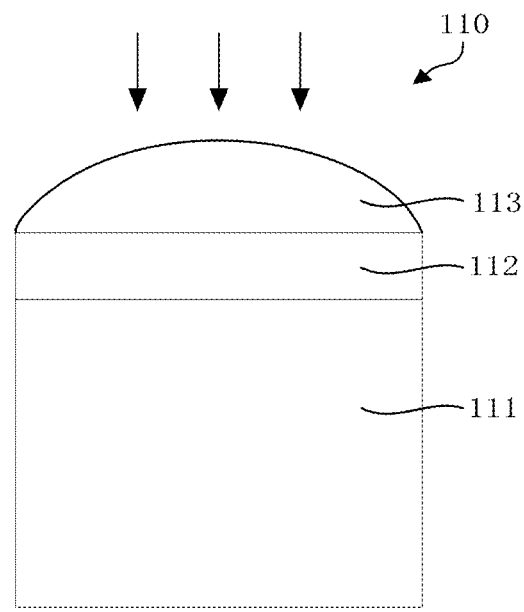
FIG. 3 is a schematic diagram illustrating a cross-sectional view of a photosensitive pixel according to some embodiments of the disclosure.
Figure 4:
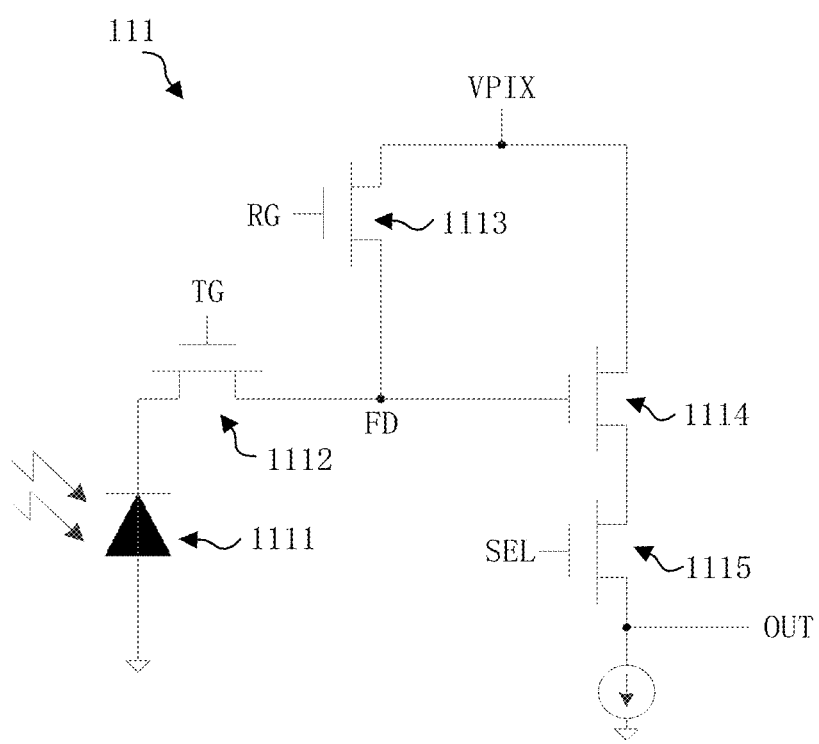
FIG. 4 is a schematic diagram illustrating a pixel circuit of the photosensitive pixel according to some embodiments of the disclosure.

For example, the pixel array may include multiple photosensitive pixels 110 (as illustrated in FIG. 3) arranged in a two-dimensional array (i.e., arranged in a two-dimensional matrix form), and each photosensitive pixel 110 includes a photoelectric conversion element 1111 (illustrated in FIG. 4). Each photosensitive pixel 110 converts light into electric charge according to an intensity of incident light.

For example, the vertical driving unit 12 includes a shift register and an address decoder. The vertical driving unit 12 includes a readout scanning function and a reset scanning function. The readout scanning function refers to sequentially scanning unit photosensitive pixels 110 row by row, and reading signals from these unit photosensitive pixels 110 row by row. For example, a signal output by each photosensitive pixel 110 in the selected and scanned photosensitive pixel row is transmitted to the column processing unit 14. The reset scanning function is configured to reset the electric charge, and a photo-electron of the photoelectric conversion element 1111 is discarded, such that the accumulation of new photo-electron may be started.

For example, the signal processing performed by the column processing unit 14 is correlated double sampling (CDS) processing. In the CDS process, a reset level and a signal level output by each photosensitive pixel 110 in the selected photosensitive pixel row are taken out, and a level difference is calculated. In this way, the signals of the photosensitive pixels 110 in a row are obtained. The column processing unit 14 may have an analog-to-digital (A/D) conversion function for converting an analog pixel signal into a digital format.

For example, the horizontal driving unit 15 includes a shift register and an address decoder. The horizontal driving unit 15 may sequentially scan the two-dimensional pixel array 11 column by column. Through the selection scanning operation performed by the horizontal driving unit 15, each pixel column is sequentially processed and output by the column processing unit 14.

For example, the control unit 13 may configure timing signals according to an operation mode, and utilize multiple types of timing signals to control the vertical driving unit 12, the column processing unit 14, and the horizontal driving unit 15 to work together.

Referring to FIG. 3, the photosensitive pixel 110 includes a pixel circuit 111, a filter 112, and a microlens 113. The microlens 113, the filter 112, and the pixel circuit 111 are arranged in sequence along the light-receiving direction of the photosensitive pixel 110. The microlens 113 is configured to condense light, and the filter 112 is configured to pass light of a certain wavelength band and filter out the light of other wavelength bands. The pixel circuit 111 is configured to convert the received light into electrical signals, and provide the generated electrical signals to the column processing unit 14 illustrated in FIG. 2.

Referring to FIG. 4, the pixel circuit 111 may be applied to each photosensitive pixel 110 (as illustrated in FIG. 3) in the pixel array 11 as illustrated in FIG. 2. The working principle of the pixel circuit 111 will be described below with reference to FIGS. 2 to 4

As illustrated in FIG. 4, the pixel circuit 111 includes a photoelectric conversion element 1111 (e.g., a photodiode), an exposure control circuit (e.g., a transfer transistor 1112), a reset circuit (e.g., reset transistor 1113), an amplifier circuit (e.g., an amplifier transistor 1114), and a selection circuit (e.g., a selection transistor 1115). In the embodiments of the disclosure, the transfer transistor 1112, the reset transistor 1113, the amplifier transistor 1114, and the selection transistor 1115 are, for example, MOS transistors, but are not limited thereto.

For example, the photoelectric conversion element 1111 includes a photodiode, and the anode of the photodiode may be connected to the ground. The photodiode converts the received light into an electric charge. The cathode of the photodiode is connected to a floating diffusion unit FD through the exposure control circuit (for example, the transfer transistor 1112). The FD is connected to the gate of the amplifier transistor 1114 and the source of the reset transistor 1113.

For example, the exposure control circuit is the transfer transistor 1112, and the control terminal TG of the exposure control circuit is the gate of the transfer transistor 1112. When a pulse of an active level (for example, a VPIX level) is transmitted to the gate of the transfer transistor 1112 through an exposure control line, the transfer transistor 1112 is turned on. The transfer transistor 1112 transfers the photoconverted charge from the photodiode to the floating diffusion unit FD.

For example, the drain of the reset transistor 1113 is connected to the pixel power supply (VPIX). The source of the reset transistor 1113 is connected to the floating diffusion unit FD. Before the charge is transferred from the photodiode to the floating diffusion unit FD, the pulse of the effective reset level is transmitted to the gate of the reset transistor 1113 through a reset line, and the reset transistor 1113 is turned on. The reset transistor 1113 resets the floating diffusion unit FD to the pixel power supply VPIX.

For example, the gate of the amplifier transistor 1114 is connected to the floating diffusion unit FD. The drain of the amplifier transistor 1114 is connected to the pixel power supply VPIX. After the floating diffusion unit FD is reset by the reset transistor 1113, the amplifier transistor 1114 outputs a reset level through an output terminal OUT through the selection transistor 1115. After the charge of the photodiode is transferred by the transfer transistor 1112, the amplifier transistor 1114 outputs a signal level through the output terminal OUT of the selection transistor 1115.

For example, the drain of the selection transistor 1115 is connected to the source of the amplifier transistor 1114. The source of the selection transistor 1115 is connected to the column processing unit 14 in FIG. 2 through the output terminal OUT. When the pulse of the active level is transmitted to the gate of the selection transistor 1115 through the selection line, the selection transistor 1115 is turned on. The signal output by the amplifier transistor 1114 is transmitted to the column processing unit 14 through the selection transistor 1115.

It should be noted that the pixel structure of the pixel circuit 111 in the embodiments of the disclosure is not limited to the structure shown in FIG. 4. For example, the pixel circuit 111 may have a three-transistor pixel structure, in which the functions of the amplifier transistor 1114 and the selection transistor 1115 are performed by a transistor. For example, the exposure control circuit is not limited to a single transfer transistor 1112, and other electronic elements or structures with the function of controlling the conduction of the control terminal may also be implemented as the exposure control circuit in the embodiments of the disclosure. The single transfer transistor 1112 according to the embodiments of the disclosure is simple to implement, low cost, and easy to control.

Referring to FIGS. 5 to 15, schematic diagrams of the arrangement of the photosensitive pixels 110 (as illustrated in FIG. 3) in the pixel array 11 (as illustrated in FIG. 2) according to some embodiments of the disclosure are illustrated. The photosensitive pixels 110 include two types, one is a transparent photosensitive pixel W, and the other is a color photosensitive pixel. The pixel array 11 includes multiple minimum repeating units, and each minimum repeating unit includes multiple subunits. FIGS. 5 to 15 only illustrates the arrangements of multiple photosensitive pixels 110 in one minimum repeating unit composed of four subunits. In other examples, the quantity of the subunits in each minimum repeating unit may also be two, three, five, ten, etc., which is not limited to these examples. The pixel array 11 may be formed by duplicating the minimum repeating unit composed of the four subunits, which is illustrated in FIGS. 5 to 17, multiple times on the rows and columns. Each subunit includes at least one transparent photosensitive pixel and at least one color photosensitive pixel. Specifically, in each sub-unit, the transparent photosensitive pixels W and the color photosensitive pixels may be alternately arranged. In at least one alternative embodiment, in each sub-unit, multiple photosensitive pixels 110 in the same row may have the same color channel. In at least one alternative embodiment, in each sub-unit, multiple photosensitive pixels 110 in the same column may have the same color channel. In at least one alternative embodiment, in each minimum repeating unit, multiple photosensitive pixels 110 in the same row and with the same color channel and multiple photosensitive pixels 110 in the same column and with the same color may be arranged alternatively. In at least one alternative embodiment, in a case where there is one transparent photosensitive pixel and multiple color photosensitive pixels in each sub-unit, the transparent photosensitive pixel W may be located at any position in the sub-unit. In at least one alternative embodiment, in a case where there is multiple transparent photosensitive pixels and one color photosensitive pixel in each sub-unit, the color photosensitive pixel may be located at any position in the sub-unit.

Specifically, for example, FIG. 5 is a schematic diagram illustrating an arrangement of photosensitive pixels 110 (as illustrated in FIG. 3) in a minimum repeating unit in the pixel array according to some embodiment of the disclosure. The minimum repeating unit is composed of 16 photosensitive pixels 110 which are arranged in 4 rows and 4 columns, and each sub-unit is composed of 4 photosensitive pixels 110 arranged in 2 rows and 2 columns. The arrangement is:

| W | A | W | B |
|---|---|---|---|
| A | W | B | W |
| W | B | W | C |
| B | W | C | W | where W represents the transparent photosensitive pixel W, A represents a first color photosensitive pixel in the multiple color photosensitive pixels, B represents a second color photosensitive pixel in the multiple color photosensitive pixels, and C represents a third color photosensitive pixel in the multiple color photosensitive pixels.

As illustrated in FIG. 5, for each sub-unit, the transparent photosensitive pixel W and the color photosensitive pixel are arranged alternatively.

As illustrated in FIG. 5, there are three types of sub-units. Specifically, a first type of sub-unit UA includes multiple transparent photosensitive pixels W and multiple first color photosensitive pixels A; a second type of sub-unit UB includes multiple transparent photosensitive pixels W and multiple second color photosensitive pixels B; and a third type of sub-unit UC includes multiple transparent photosensitive pixels W and multiple third color photosensitive pixels C. Each minimum repeating unit includes four subunits, i.e., one first type of sub-unit UA, two second type of sub-units UB, and one third type of sub-unit UC. Specifically, the first type of sub-unit UA and the third type of sub-unit UC are arranged in a first diagonal direction D1 (for example, a direction connecting the upper left corner and the lower right corner in FIG. 5), and the two second type of sub-units UB are arranged in a second diagonal direction D2 (for example, a direction connecting the upper right corner and the lower left corner in FIG. 5). The first diagonal direction D1 is different from the second diagonal direction D2. For example, the first diagonal and the second diagonal are perpendicular.

It should be noted that, in some other embodiments, the first diagonal direction D1 may also refers to the direction connecting the upper right corner and the lower left corner, and the second diagonal direction D2 may also refers to the direction connecting the upper left corner and the lower right corner. In addition, the term "direction" used herein does not refer to a single direction, but may be understood as a concept of a "straight line", that is, the term "direction" has bidirectional directions between two ends of the straight line. The explanation of the first diagonal direction D1 and the second diagonal direction D2 in FIGS. 6 to 10 is the same as the explanation that given here.

Figure 6:
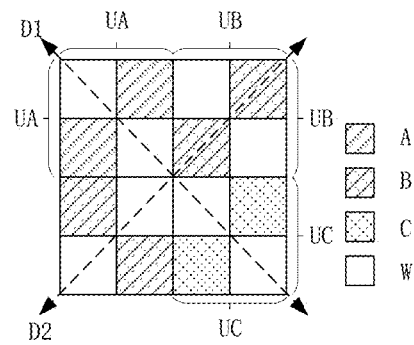

For another example, FIG. 6 is a schematic diagram illustrating an arrangement of photosensitive pixels 110 (as illustrated in FIG. 3) in a minimum repeating unit in the pixel array according to some embodiment of the disclosure. The minimum repeating unit is composed of 16 photosensitive pixels 110 which are arranged in 4 rows and 4 columns, and each sub-unit is composed of 4 photosensitive pixels 110 arranged in 2 rows and 2 columns. The arrangement is:

$$\begin{array}{cccc} W & A & W & B \\ A & W & B & W \\ B & W & W & C \\ W & B & C & W \end{array}$$

where W represents the transparent photosensitive pixel W, A represents a first color photosensitive pixel in the multiple color photosensitive pixels, B represents a second color photosensitive pixel in the multiple color photosensitive pixels, and C represents a third color photosensitive pixel in the multiple color photosensitive pixels.

The arrangement of the photosensitive pixels 110 in the minimum repeating unit illustrated in FIG. 6 is almost the same as the arrangement of the photosensitive pixels 110 in the minimum repeating unit illustrated in FIG. 5. The difference is that the alternating sequence of the transparent photosensitive pixels W and the color photosensitive pixels in the second type of sub-unit UB located in the lower left corner in FIG. 6 is different from the alternating sequence of the transparent photosensitive pixels W and the color photosensitive pixels in the second type of sub-unit UB located in the lower left corner in FIG. 5. Specifically, in the second type of sub-unit UB located in the lower left corner in FIG. 5, the alternating order of the photosensitive pixels 110 in the first row is the transparent photosensitive pixel W and the color photosensitive pixel (i.e., the second color photosensitive pixel B); and the alternating order of the photosensitive pixels 110 in the second row is the color photosensitive pixel (i.e., the second color photosensitive pixel B) and the transparent photosensitive pixel W. In the second type of sub-unit UB located in the lower left corner in FIG. 6, the alternating order of the photosensitive pixels 110 in the first row is the color photosensitive pixel (i.e., the second color photosensitive pixel B) and the transparent photosensitive pixel W, and the alternating order of the photosensitive pixels 110 in the second row is the transparent photosensitive pixel W, the color photosensitive pixel (i.e., the second color photosensitive pixel B).

As illustrated in FIG. 6, the alternating orders of the transparent photosensitive pixels W and the color photosensitive pixels in the first type of sub-unit UA and the third type of sub-unit UC are different from the alternating order of the transparent photosensitive pixels W and the color photosensitive pixels in the second type of sub-unit UB located in the lower left corner. Specifically, in the first type of sub-unit UA and the third type of sub-unit UC illustrated in FIG. 6, the alternating order of the photosensitive pixels 110 in the first row is the transparent photosensitive pixel W and the color photosensitive pixel, and the alternating order of the photosensitive pixels 110 in the second row is the color photosensitive pixel and the transparent photosensitive pixel W. In the second type of sub-unit UB located at the lower left corner illustrated in FIG. 6, the alternating order of the photosensitive pixels 110 in the first row is the color photosensitive pixel (i.e., the second color photosensitive pixel B) and the transparent photosensitive pixel W, and the alternating order of the photosensitive pixels 110 in the second row is the transparent photosensitive pixel W and the color photosensitive pixel (i.e., the second color photosensitive pixel B).

Thus, as illustrated in FIGS. 5 and 6, in the minimum repeating unit, the alternating orders of the transparent photosensitive pixels W and the color photosensitive pixels in different sub-units may be the same (as illustrated in FIG. 5) or different (as illustrated in FIG. 6).

Figure 7:
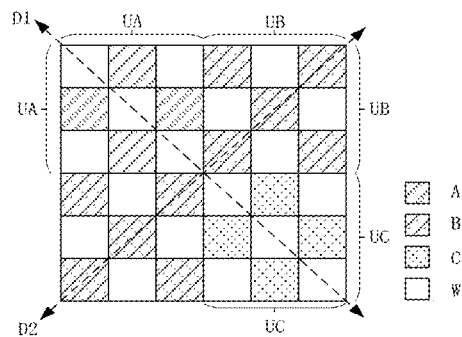

Specifically, for example, FIG. 7 is a schematic diagram illustrating still another arrangement of photosensitive pixels 110 (as illustrated in FIG. 3) in a minimum repeating unit in the pixel array according to some embodiment of the disclosure. The minimum repeating unit is composed of 36 photosensitive pixels 110 which are arranged in 6 rows and 6 columns, and each sub-unit is composed of 9 photosensitive pixels 110 arranged in 3 rows and 3 columns. The arrangement is:

$$\begin{array}{cccccc} W & A & W & B & W & B \\ A & W & A & W & B & W \\ W & A & W & B & W & B \\ B & W & B & W & C & W \\ W & B & W & C & W & C \\ B & W & B & W & C & W \end{array}$$

where W represents the transparent photosensitive pixel, A represents a first color photosensitive pixel in the multiple color photosensitive pixels, B represents a second color photosensitive pixel in the multiple color photosensitive pixels, and C represents a third color photosensitive pixel in the multiple color photosensitive pixels.

As illustrated in FIG. 7, for each sub-unit, the transparent photosensitive pixel W and the color photosensitive pixel are arranged alternatively.

As illustrated in FIG. 7, there are three types of sub-units. Specifically, a first type of sub-unit UA includes multiple transparent photosensitive pixels W and multiple first color photosensitive pixels A; a second type of sub-unit UB includes multiple transparent photosensitive pixels W and multiple second color photosensitive pixels B; and a third type of sub-unit UC includes multiple transparent photosensitive pixels W and multiple third color photosensitive pixels C. Each minimum repeating unit includes four subunits, i.e., one first type of sub-unit UA, two second type of sub-units UB, and one third type of sub-unit UC. Specifically, the first type of sub-unit UA and the third type of sub-unit UC are arranged in a first diagonal direction D1, and the two second type of sub-units UB are arranged in a second diagonal direction D2. The first diagonal direction D1 is different from the second diagonal direction D2. For example, the first diagonal and the second diagonal are perpendicular.

Figure 8:
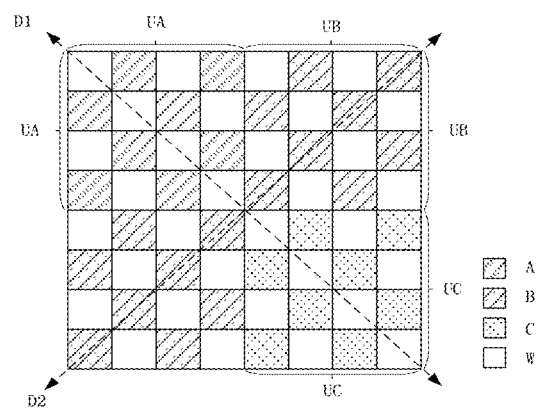

In yet another example, FIG. 8 is a schematic diagram illustrating yet another arrangement of photosensitive pixels 110 (as illustrated in FIG. 3) in a minimum repeating unit in the pixel array according to some embodiment of the disclosure. The minimum repeating unit is composed of 64 photosensitive pixels 110 which are arranged in 8 rows and 8 columns, and each sub-unit is composed of 16 photosensitive pixels 110 arranged in 4 rows and 4 columns. The arrangement is:

$$
\begin{array}{cccccccc}
W & A & W & A & W & B & W & B \\
A & W & A & W & B & W & B & W \\
A & W & A & W & B & W & B & W \\
A & W & A & W & B & W & B & W \\
A & W & A & W & B & W & B & W \\
B & W & B & W & C & W & C & W \\
W & B & W & B & W & C & W & C \\
B & W & B & W & C & W & C & W \\
\end{array}
$$

where W represents the transparent photosensitive pixel, A represents a first color photosensitive pixel in the multiple color photosensitive pixels, B represents a second color photosensitive pixel in the multiple color photosensitive pixels, and C represents a third color photosensitive pixel in the multiple color photosensitive pixels.

As illustrated in FIG. 8, for each sub-unit, the transparent photosensitive pixel W and the color photosensitive pixel are arranged alternatively.

As illustrated in FIG. 8, there are three types of sub-units. Specifically, a first type of sub-unit UA includes multiple transparent photosensitive pixels W and multiple first color photosensitive pixels A; a second type of sub-unit UB includes multiple transparent photosensitive pixels W and multiple second color photosensitive pixels B; and a third type of sub-unit UC includes multiple transparent photosensitive pixels W and multiple third color photosensitive pixels C. Each minimum repeating unit includes four subunits, i.e., one first type of sub-unit UA, two second type of sub-units UB, and one third type of sub-unit UC. Specifically, the first type of sub-unit UA and the third type of sub-unit UC are arranged in a first diagonal direction D1, and the two second type of sub-units UB are arranged in a second diagonal direction D2. The first diagonal direction D1 is different from the second diagonal direction D2. For example, the first diagonal and the second diagonal are perpendicular.

Figure 9:
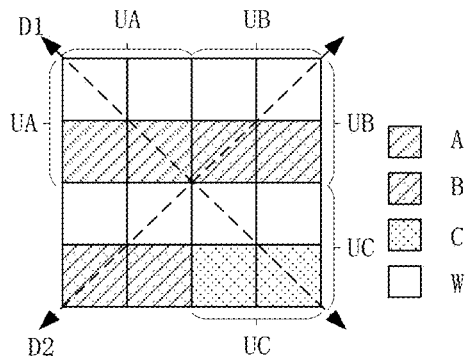

In still another example, FIG. 9 is a schematic diagram illustrating still yet another arrangement of photosensitive pixels 110 (as illustrated in FIG. 3) in a minimum repeating unit in the pixel array according to some embodiment of the disclosure. The minimum repeating unit is composed of 16 photosensitive pixels 110 which are arranged in 4 rows and 4 columns, and each sub-unit is composed of 4 photosensitive pixels 110 arranged in 2 rows and 2 columns. The arrangement is:

$$
\begin{array}{cccc}
W & W & W & W \\
A & A & B & B \\
W & W & W & W \\
B & B & C & C \\
\end{array}
$$

where W represents the transparent photosensitive pixel W, A represents a first color photosensitive pixel in the multiple color photosensitive pixels, B represents a second color photosensitive pixel in the multiple color photosensitive pixels, and C represents a third color photosensitive pixel in the multiple color photosensitive pixels.

As illustrated in FIG. 9, in each sub-unit, the photosensitive pixels 110 in the same row have the same color channel (that is, the photosensitive pixels 110 in the same row belong to the same type of photosensitive pixels 110. Specifically, the same type of photosensitive pixels 110 includes the following conditions: (1) all the photosensitive pixels 110 are the transparent photosensitive pixels W; (2) all the photosensitive pixels 110 are the first color photosensitive pixels A; (3) all the photosensitive pixels 110 are the second color photosensitive pixels B; (4) all the photosensitive pixels 110 are the third color photosensitive pixels C.

As illustrated in FIG. 9, there are three types of sub-units. Specifically, a first type of sub-unit UA includes multiple transparent photosensitive pixels W and multiple first color photosensitive pixels A; a second type of sub-unit UB includes multiple transparent photosensitive pixels W and multiple second color photosensitive pixels B; and a third type of sub-unit UC includes multiple transparent photosensitive pixels W and multiple third color photosensitive pixels C. The multiple photosensitive pixels 110 with the same color channel may be located either in the first row of the sub-unit or in the second row of the sub-unit, which are not limited herein. Each minimum repeating unit includes four subunits, i.e., one first type of sub-unit UA, two second type of sub-units UB, and one third type of sub-unit UC. Specifically, the first type of sub-unit UA and the third type of sub-unit UC are arranged in a first diagonal direction D1, and the two second type of sub-units UB are arranged in a second diagonal direction D2. The first diagonal direction D1 is different from the second diagonal direction D2. For example, the first diagonal and the second diagonal are perpendicular.

Figure 10:
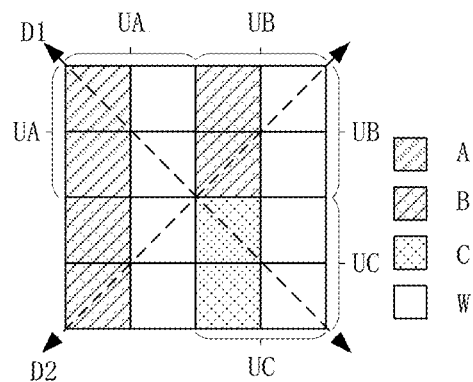

Specifically, in another example, FIG. 10 is a schematic diagram illustrating still yet another arrangement of photosensitive pixels 110 (as illustrated in FIG. 3) in a minimum repeating unit in the pixel array according to some embodiment of the disclosure. The minimum repeating unit is composed of 16 photosensitive pixels 110 which are arranged in 4 rows and 4 columns, and each sub-unit is composed of 4 photosensitive pixels 110 arranged in 2 rows and 2 columns. The arrangement is:

$$
\begin{array}{cccc}
A & W & B & W \\
A & W & B & W \\
B & W & C & W \\
B & W & C & W \\
\end{array}
$$

where W represents the transparent photosensitive pixel W, A represents a first color photosensitive pixel in the multiple color photosensitive pixels, B represents a second color photosensitive pixel in the multiple color photosensitive pixels, and C represents a third color photosensitive pixel in the multiple color photosensitive pixels.

As illustrated in FIG. 10, in each sub-unit, the multiple photosensitive pixels 110 located in the same column have the same color channel (i.e., the multiple photosensitive pixels 110 located in the same column belong to the same type of photosensitive pixel 110). Specifically, the same type of photosensitive pixels 110 includes the following conditions: (1) all the photosensitive pixels 110 are the transparent photosensitive pixels W; (2) all the photosensitive pixels 110 are the first color photosensitive pixels A; (3) all the photosensitive pixels 110 are the second color photosensitive pixels B; (4) all the photosensitive pixels 110 are the third color photosensitive pixels C.

As illustrated in FIG. 10, there are three types of sub-units. Specifically, a first type of sub-unit UA includes multiple transparent photosensitive pixels W and multiple first color photosensitive pixels A; a second type of sub-unit UB includes multiple transparent photosensitive pixels W and multiple second color photosensitive pixels B; and a third type of sub-unit UC includes multiple transparent photosensitive pixels W and multiple third color photosensitive pixels C. The multiple photosensitive pixels 110 with the same color channel may be located either in the first column of the sub-unit or in the second column of the sub-unit, which are not limited herein. Each minimum repeating unit includes four subunits, i.e., one first type of sub-unit UA, two second type of sub-units UB, and one third type of sub-unit UC. Specifically, the first type of sub-unit UA and the third type of sub-unit UC are arranged in a first diagonal direction D1, and the two second type of sub-units UB are arranged in a second diagonal direction D2. The first diagonal direction D1 is different from the second diagonal direction D2. For example, the first diagonal and the second diagonal are perpendicular.

Figure 11:
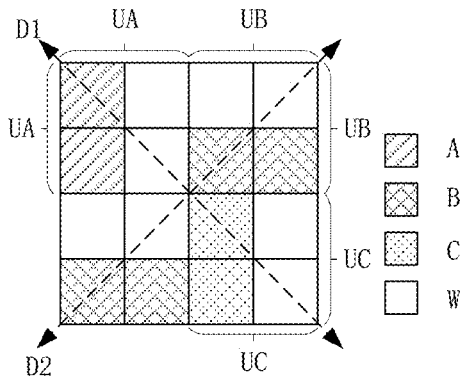

In still yet another example, FIG. 11 is a schematic diagram illustrating still yet another arrangement of photosensitive pixels 110 (as illustrated in FIG. 3) in a minimum repeating unit in the pixel array according to some embodiment of the disclosure. The minimum repeating unit is composed of 16 photosensitive pixels 110 which are arranged in 4 rows and 4 columns, and each sub-unit is composed of 4 photosensitive pixels 110 arranged in 2 rows and 2 columns. The arrangement is:

$$\begin{matrix} A & W & W & W \\ A & W & B & B \\ W & W & C & W \\ B & B & C & W \end{matrix}$$

where W represents the transparent photosensitive pixel W, A represents a first color photosensitive pixel in the multiple color photosensitive pixels, B represents a second color photosensitive pixel in the multiple color photosensitive pixels, and C represents a third color photosensitive pixel in the multiple color photosensitive pixels.

As illustrated in FIG. 11, in each sub-unit, the photosensitive pixels 110 in the same row or the same column have the same color channel (that is, the photosensitive pixels 110 in the same row or in same column belong to the same type of photosensitive pixels 110. Specifically, the same type of photosensitive pixels 110 includes the following conditions: (1) all the photosensitive pixels 110 are the transparent photosensitive pixels W; (2) all the photosensitive pixels 110 are the first color photosensitive pixels A; (3) all the photosensitive pixels 110 are the second color photosensitive pixels B; (4) all the photosensitive pixels 110 are the third color photosensitive pixels C.

As illustrated in FIG. 11, there are three types of sub-units. Specifically, a first type of sub-unit UA includes multiple transparent photosensitive pixels W and multiple first color photosensitive pixels A, the multiple transparent photosensitive pixels W locate in the same column, and the multiple first color photosensitive pixels A locate in the same column. A second type of sub-unit UB includes multiple transparent photosensitive pixels W and multiple second color photosensitive pixels B, the multiple transparent photosensitive pixels W locate in the same row, and the multiple second color photosensitive pixels B locates in the same row. A third type of sub-unit UC includes multiple transparent photosensitive pixels W and multiple third color photosensitive pixels C, the multiple transparent photosensitive pixels W locates in the same column, and the multiple third color photosensitive pixels C locates in the same column. Each minimum repeating unit includes four sub-units, i.e., one first type of sub-unit UA, two second type of sub-units UB, and one third type of sub-unit UC. Specifically, the first type of sub-unit UA and the third type of sub-unit UC are arranged in a first diagonal direction D1, and the two second type of sub-units UB are arranged in a second diagonal direction D2. The first diagonal direction D1 is different from the second diagonal direction D2. For example, the first diagonal and the second diagonal are perpendicular.

Thus, as illustrated in FIG. 11, in the same minimum repeating unit, the multiple photosensitive pixels 110 located in the same row in some sub-units belong to the same type of photosensitive pixel 110, and the multiple photosensitive pixels 110 located in the same column in some other sub-units belong to the same type of photosensitive pixel 110.

Figure 12:
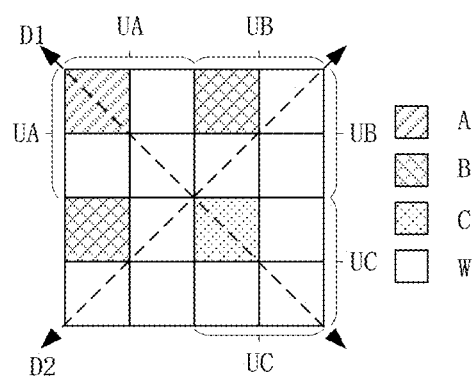

In still yet another example, FIG. 12 is a schematic diagram illustrating still another arrangement of photosensitive pixels 110 (as illustrated in FIG. 3) in a minimum repeating unit in the pixel array according to some embodiment of the disclosure. The minimum repeating unit is composed of 16 photosensitive pixels 110 which are arranged in 4 rows and 4 columns, and each sub-unit is composed of 4 photosensitive pixels 110 arranged in 2 rows and 2 columns. The arrangement is:

$$\begin{matrix} A & W & B & W \\ W & W & W & W \\ B & W & C & W \\ W & W & W & W \end{matrix}$$

where W represents the transparent photosensitive pixel W, A represents a first color photosensitive pixel in the multiple color photosensitive pixels, B represents a second color photosensitive pixel in the multiple color photosensitive pixels, and C represents a third color photosensitive pixel in the multiple color photosensitive pixels.

As illustrated in FIG. 12, each sub-unit contains only one photosensitive pixel among the four photosensitive pixels 110. In each minimum repeating unit, the color photosensitive pixel may be located at any position in the sub-unit (for example, located at the upper left position of the sub-unit as illustrated in FIG. 12).

As illustrated in FIG. 12, there are three types of sub-units. Specifically, a first type of sub-unit UA includes multiple transparent photosensitive pixels W and one first color photosensitive pixel A; a second type of sub-unit UB includes multiple transparent photosensitive pixels W and one second color photosensitive pixel B; and a third type of sub-unit UC includes multiple transparent photosensitive pixels W and one third color photosensitive pixel C. Each minimum repeating unit includes four subunits, i.e., one first type of sub-unit UA, two second type of sub-units UB, and one third type of sub-unit UC. Specifically, the first type of sub-unit UA and the third type of sub-unit UC are arranged in a first diagonal direction D1, and the two second type of sub-units UB are arranged in a second diagonal direction D2. The first diagonal direction D1 is different from the second diagonal direction D2. For example, the first diagonal and the second diagonal are perpendicular.

In still yet another example, FIG. 13 is a schematic diagram illustrating still another arrangement of photosensitive pixels 110 (as illustrated in FIG. 3) in a minimum repeating unit in the pixel array according to some embodiment of the disclosure. The minimum repeating unit is composed of 16 photosensitive pixels 110 which are arranged in 4 rows and 4 columns, and each sub-unit is composed of 4 photosensitive pixels 110 arranged in 2 rows and 2 columns. The arrangement is:

$$
\begin{array}{cccc}
A & W & W & B \\
W & W & W & W \\
W & W & W & W \\
B & W & W & C
\end{array}
$$

where W represents the transparent photosensitive pixel W, A represents a first color photosensitive pixel in the multiple color photosensitive pixels, B represents a second color photosensitive pixel in the multiple color photosensitive pixels, and C represents a third color photosensitive pixel in the multiple color photosensitive pixels.

As illustrated in FIG. 13, each sub-unit contains only one photosensitive pixel among the four photosensitive pixels 110. In each minimum repeating unit, the color photosensitive pixel may be located at any position in the sub-unit (for example, located at the upper left position, the lower left corner, the upper right corner, or the lower right corner of the sub-unit as illustrated in FIG. 12).

As illustrated in FIG. 13, there are three types of sub-units. Specifically, a first type of sub-unit UA includes multiple transparent photosensitive pixels W and one first color photosensitive pixel A; a second type of sub-unit UB includes multiple transparent photosensitive pixels W and one second color photosensitive pixel B; and a third type of sub-unit UC includes multiple transparent photosensitive pixels W and one third color photosensitive pixel C. Each minimum repeating unit includes four subunits, i.e., one first type of sub-unit UA, two second type of sub-units UB, and one third type of sub-unit UC. Specifically, the first type of sub-unit UA and the third type of sub-unit UC are arranged in a first diagonal direction D1, and the two second type of sub-units UB are arranged in a second diagonal direction D2. The first diagonal direction D1 is different from the second diagonal direction D2. For example, the first diagonal and the second diagonal are perpendicular.

For still yet another example, FIG. 14 is a schematic diagram illustrating still another arrangement of photosensitive pixels 110 (as illustrated in FIG. 3) in a minimum repeating unit in the pixel array according to some embodiment of the disclosure. The minimum repeating unit is composed of 16 photosensitive pixels 110 which are arranged in 4 rows and 4 columns, and each sub-unit is composed of 4 photosensitive pixels 110 arranged in 2 rows and 2 columns. The arrangement is:

$$
\begin{array}{cccc}
W & A & W & B \\
A & A & B & B \\
W & B & W & C \\
B & B & C & C
\end{array}
$$

where W represents the transparent photosensitive pixel W, A represents a first color photosensitive pixel in the multiple color photosensitive pixels, B represents a second color photosensitive pixel in the multiple color photosensitive pixels, and C represents a third color photosensitive pixel in the multiple color photosensitive pixels.

As illustrated in FIG. 14, there is only one transparent photosensitive pixel W among the four photosensitive pixels 110 of each sub-unit. In each minimum repeating unit, the transparent photosensitive pixel W may be located at any position in the sub-unit (for example, located at the upper left position of the sub-unit as illustrated in FIG. 14).

As illustrated in FIG. 14, there are three types of sub-units. Specifically, a first type of sub-unit UA includes one transparent photosensitive pixel W and multiple first color photosensitive pixels A; a second type of sub-unit UB includes one transparent photosensitive pixel W and multiple second color photosensitive pixels B; and a third type of sub-unit UC includes one transparent photosensitive pixel W and multiple third color photosensitive pixels C. Each minimum repeating unit includes four subunits, i.e., one first type of sub-unit UA, two second type of sub-units UB, and one third type of sub-unit UC. Specifically, the first type of sub-unit UA and the third type of sub-unit UC are arranged in a first diagonal direction D1, and the two second type of sub-units UB are arranged in a second diagonal direction D2. The first diagonal direction D1 is different from the second diagonal direction D2. For example, the first diagonal and the second diagonal are perpendicular.

Figure 15:
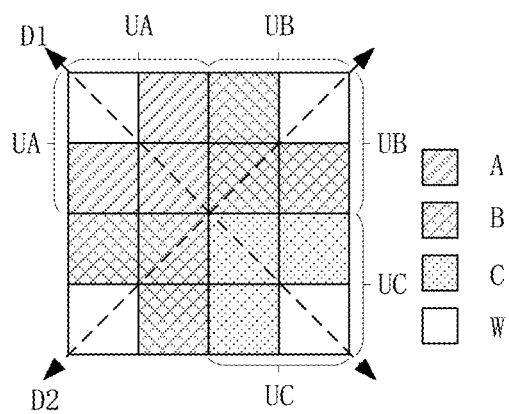

In still yet another example, FIG. 15 is a schematic diagram illustrating still another arrangement of photosensitive pixels 110 (as illustrated in FIG. 3) in a minimum repeating unit in the pixel array according to some embodiment of the disclosure. The minimum repeating unit is composed of 16 photosensitive pixels 110 which are arranged in 4 rows and 4 columns, and each sub-unit is composed of 4 photosensitive pixels 110 arranged in 2 rows and 2 columns. The arrangement is:

$$
\begin{array}{cccc}
W & A & B & W \\
A & A & B & B \\
B & B & C & C \\
W & B & C & W
\end{array}
$$

where W represents the transparent photosensitive pixel W, A represents a first color photosensitive pixel in the multiple color photosensitive pixels, B represents a second color photosensitive pixel in the multiple color photosensitive pixels, and C represents a third color photosensitive pixel in the multiple color photosensitive pixels.

As illustrated in FIG. 15, there is only one transparent photosensitive pixel W among the four photosensitive pixels

110 of each sub-unit. In each minimum repeating unit, the transparent photosensitive pixel W may be located at any position in the sub-unit (for example, located at the upper left position, the lower left position, the upper right position or the lower right position of the sub-unit as illustrated in FIG. 15).

As illustrated in FIG. 15, there are three types of sub-units. Specifically, a first type of sub-unit UA includes one transparent photosensitive pixel W and multiple first color photosensitive pixels A; a second type of sub-unit UB includes one transparent photosensitive pixel W and multiple second color photosensitive pixels B; and a third type of sub-unit UC includes one transparent photosensitive pixel W and multiple third color photosensitive pixels C. Each minimum repeating unit includes four subunits, i.e., one first type of sub-unit UA, two second type of sub-units UB, and one third type of sub-unit UC. Specifically, the first type of sub-unit UA and the third type of sub-unit UC are arranged in a first diagonal direction D1, and the two second type of sub-units UB are arranged in a second diagonal direction D2. The first diagonal direction D1 is different from the second diagonal direction D2. For example, the first diagonal and the second diagonal are perpendicular.

In some embodiments, in the minimum repeating unit illustrated in FIGS. 5 to 15, the first color photosensitive pixel A may be a red photosensitive pixel R; the second color photosensitive pixel B may be a green photosensitive pixel G; and the third color photosensitive pixel C may be a blue photosensitive pixel Bu.

In some embodiments, in the minimum repeating unit illustrated in FIGS. 5 to 15, the first color photosensitive pixel A may be the red photosensitive pixel R; the second color photosensitive pixel B may be a yellow photosensitive pixel Y; and the third color photosensitive pixel C may be the blue photosensitive pixel Bu.

In some embodiments, in the minimum repeating unit illustrated in FIGS. 5 to 15, the first color photosensitive pixel A may be a magenta photosensitive pixel R; the second color photosensitive pixel B may be a cyan photosensitive pixel Cy; and the third color photosensitive pixel C may be the yellow photosensitive pixel Y.

It should be noted that, in some embodiments, the response band of the transparent pixel W is a visible light band (for example, 400 nm-760 nm). For example, the transparent photosensitive pixel W is provided with an infrared filter to filter out infrared light. In some embodiments, the response band of the transparent photosensitive pixel W includes the visible light wavelength band and the near-infrared wavelength band (for example, 400 nm-1000 nm), which matches the response band of the photoelectric conversion element 1111 (as illustrated in FIG. 4) in the image sensor 10 (as illustrated in FIG. 1). For example, the transparent photosensitive pixel W may not be provided with a filter or may be provided with a filter that allows all wavelengths of light to pass through, and the response wavelength band of the transparent photosensitive pixel W is determined based on the response wavelength band of the photoelectric conversion element 1111, that is, the two response wavelength bands are matched. The embodiments of the disclosure include, but are not limited to, the above-mentioned waveband ranges.

Figure 16:
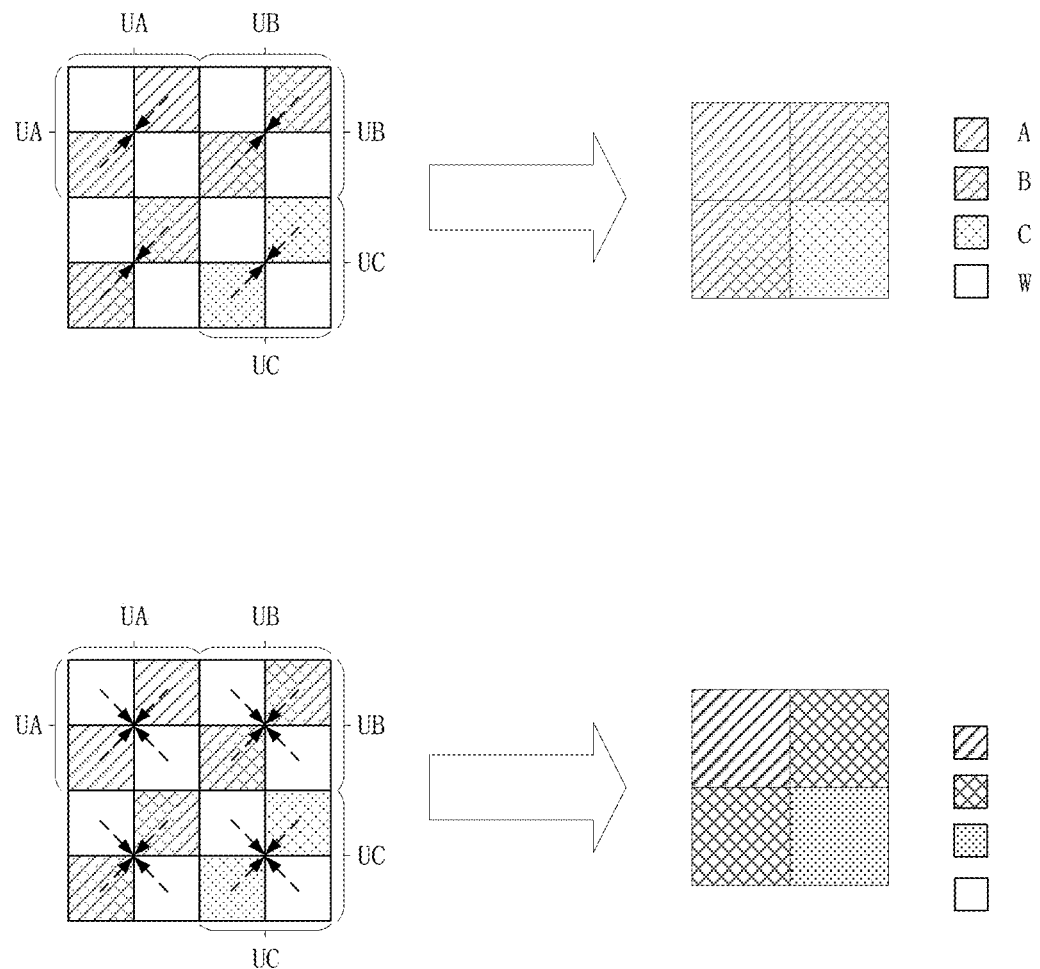
FIG. 16 is a schematic diagram illustrating a principle of acquiring an original image by an image sensor in the camera assembly according to some embodiments of the disclosure.

Referring to FIGS. 1, 2 and 16, in some embodiments, the control unit 13 controls the pixel array 11 to be exposed to thereby acquiring a first color original image and a second color original image. Specifically, the first color original image is composed of multiple pieces of first color original image data, each piece of first color original image data is generated by the at least one color photosensitive pixel of the sub-unit, the second color original image is composed of multiple pieces of second color original image data, and each piece of second color original image data is generated by the at least one transparent photosensitive pixel and the at least one color photosensitive pixel in the sub-unit. The processor 20 fuses the first color original image and the second color original image to acquire the target image.

Referring to FIG. 2, in an example, each sub-unit of the pixel array 11 includes multiple transparent photosensitive pixels W and multiple color photosensitive pixels (as illustrated in FIGS. 5 to 11). After the control unit 13 controls the pixel array 11 to be exposed, a sum or an average of multiple electrical signals, which are generated by the multiple color photosensitive pixels in response to receiving light, are taken as a piece of the first color original image data, and the multiple pieces of the first color original image data of all sub-units in the pixel array 11 form the first color original image; a sum or an average of multiple electrical signals, which are generated by the multiple transparent photosensitive pixels W and all the color photosensitive pixel in the sub-unit in response to receiving light, is taken as a piece of the second color original image data, and the multiple pieces of the second color original image data of all sub-units in the pixel array 11 form the second color original image.

Referring to FIG. 16, for example, a piece of first color original image data is acquired by calculating a sum or an average of two electrical signals generated by two first color photosensitive pixels A in the first type of sub-unit UA after receiving light. For each of the two second type of sub-units UB, a piece of first color original image data is acquired by calculating a sum or an average of two electrical signals generated by two second photosensitive pixels B in the second type of sub-unit UB after receiving light, thereby acquiring two pieces of first color original image data. For third type of sub-unit UC, a piece of first color original image data is acquired by calculating a sum or an average of two electrical signals generated by two third color photosensitive pixels C in the third type of sub-unit UC after receiving light. The four pieces of first color original image data together form a first image unit in the first color original image, and multiple pixels in the first image unit are arranged in the form of ABBC. For the first type of sub-unit UA, a piece of second color original image data is acquired by calculating a sum or an average of two electrical signals, which are generated by two transparent photosensitive pixels W after receiving light, and two electrical signals, which are generated by the two first color photosensitive pixels A after receiving light. For each of the two second type of sub-units UB, a piece of second color original image data is acquired by calculating a sum or an average of two electrical signals, which are generated by two transparent photosensitive pixels W after receiving light, and two electrical signals, which are generated by two second color photosensitive pixels B after receiving light, thereby acquiring two pieces of second color original image data. For the third type of sub-unit UC, a piece of second color original image data is acquired by calculating a sum or an average of two electrical signals, which are generated by two transparent photosensitive pixel W after receiving the light, and two electrical signals, which are generated by two third color photosensitive pixels C after receiving light. The four pieces of second color original image data together form a second image unit in the second color original image, and multiple pixels in the second image unit are arranged in the form of ABBC.

It should be noted that, in another example, when each sub-unit includes one the transparent photosensitive pixel, an electrical signal generated by the transparent photosensitive pixel W response to receiving light is taken as a piece of the first color original image data, and a sum or an average of an electrical signal generated by the color photosensitive pixel in response to receiving light and all electrical signal generated by all the transparent photosensitive pixel in response to receiving light is taken as a piece of the second color original image data. In still another example, when each sub-unit includes one the transparent photosensitive pixel W, a sum or an average of an electrical signal generated by the transparent photosensitive pixel W after receiving light and all electrical signal generated by all the color photosensitive pixel in the sub-unit after receiving light is taken as a piece of the second color original image data.

Referring to FIGS. 1 and 17, after acquiring the first color original image and the second color original image, the image sensor 10 will transmit the three original images to the processor 20, so that the processor 20 perform subsequent processing on the two original images. Specifically, the processor 20 may be configured to filter the first color original image to acquire the first color filtered image. The first color filtered image is composed of the multiple pieces of color filtered image data. The processor 20 may further configured to filter the second color original image to acquire the second color filtered image. The second color filtered image is composed of multiple pieces of second color filtered image data;

For example, the processor 20 may filter the first color original image to acquire the first color filtered image as follows. Specifically, the processor 20 may determine a first to-be-filtered pixel in the first color original image. For example, a pixel B5 is determined as the first to-be-filtered pixel. The processor may determine, according to the first to-be-filtered pixel B5, a first reference area 113 in the first color original image. Specifically, the first to-be-filtered pixel is located in the first reference area 113. It should be noted that, the first to-be-filtered pixel may be located at any position in the first reference area 113; a shape of a window formed by the first reference area may be a square, or other shapes such as a rectangle, which are not limited thereto. The size of the first reference area 113 may be 3×3, 4×4, 5×5, 3×5, 5×7, or 9×5, etc., which is not limited thereto. In the illustrated embodiments, the first reference area 113 is an area of size 3×3. The processor 20 calculate, for each of multiple first reference pixels in the first reference area 113, a weight of the first reference pixels relative to the first to-be-filtered pixel. Specifically, the multiple first reference pixel have the same color channel as the first to-be-filtered pixel, and the weight includes a weight in the spatial domain and a weight in the range domain. As illustrated in FIG. 17, the first to-be-filtered pixel is B4, and the first reference pixels include B1, B2, B5, B7 and B8. For example, the processor 20 may calculate the weight in the spatial domain for each the first reference pixel relative to the first to-be-filtered pixel according to a weight function f(∥p−q∥), where p represents coordinates of the first to-be-filtered pixel B5 in the first color original image, q represents coordinates of the first reference pixel, i.e., B1, B2, B5, B7 or B8, in the filter window (i.e., the first reference area 113) in the first color original image, and f represents the weight function in the spatial domain. According to the weight function in the spatial domain, the weight in the spatial domain for each first reference pixel, i.e., each of B1, B2, B5, B7 and B8, relative to the first reference pixel B5 may be calculated. Specifically, the smaller the coordinate difference between the first reference pixel and the first to-be-filtered pixel (that is, the closer the first reference pixel is to the first to-be-filtered pixel), the higher the weight in the spatial domain for first reference pixel relative to the first image pixel. For example, the processor may calculate the weight in the range domain for each the first reference pixel relative to the first to-be-filtered pixel according to a weight function $g(\|\tilde{I}_p-\tilde{I}_q\|)$, where $\tilde{I}_p$ represents the first color original image data (may also be understood as a pixel value) of the first to-be-filtered pixel B5, $\tilde{I}_q$ represents the first color original image data of the first reference pixel, i.e., B1, B2, B5, B7 or B8, and g represents the weight function in the range domain. According to the weight function in the range domain, the weight in the range domain for each first reference pixel, i.e., each of B1, B2, B5, B7 and B8, relative to the first reference pixel B5 may be calculated. Specifically, the larger the difference between the first color original image of the first reference pixel and the first color original image of the first to-be-filtered pixel, the smaller the weight in the range domain for the first reference pixel. After acquiring the weight in the spatial domain and the weight in the range domain for the each first reference pixel relative to the first to-be-filtered pixel, the processor 20 may correct, according to the multiple pieces of first color original image data of the multiple first reference pixels and the weights for the multiple first reference pixels, the first color original image data of the first to-be-filtered pixel to acquire a piece of the first color filtered image data. Exemplarily, the processor 20 may acquire the first color filtered image data according to the equation $$J_p = \frac{1}{k_p}\sum_{q\in\Omega}I_q f(\|p-q\|)g(\|\tilde{I}_p-\tilde{I}_q\|),$$

where $k_p=\Sigma_{q\in\Omega}f(\|p-q\|)g(\|\tilde{I}_p-\tilde{I}_q\|)$, $J_p$ represents the first color filtered image data (i.e., an output pixel value), $k_p$ represents a sum of normalized weights, $\Omega$ represents the filter window, $I_q$ represents the first color original image data corresponding to each of the first reference pixels B1, B2, B5, B7 and B8. As such, the processor 20 may calculate the first color filtered image data of the first to-be-filtered pixel B5. The processor 20 may traverse each pixel in the first color original image to acquire the multiple pieces of first color filtered image data. That is, the processor 20 may determine each pixel in the first color original image as the first to-be-filtered pixel and filter the each pixel in a manner of the embodiments illustrated in FIG. 17, thereby obtaining the first filtered image data corresponding to the pixel. After acquiring the multiple first color filtered image data, the multiple first color filtered image data may compose the first color filtered image.

Figure 18:
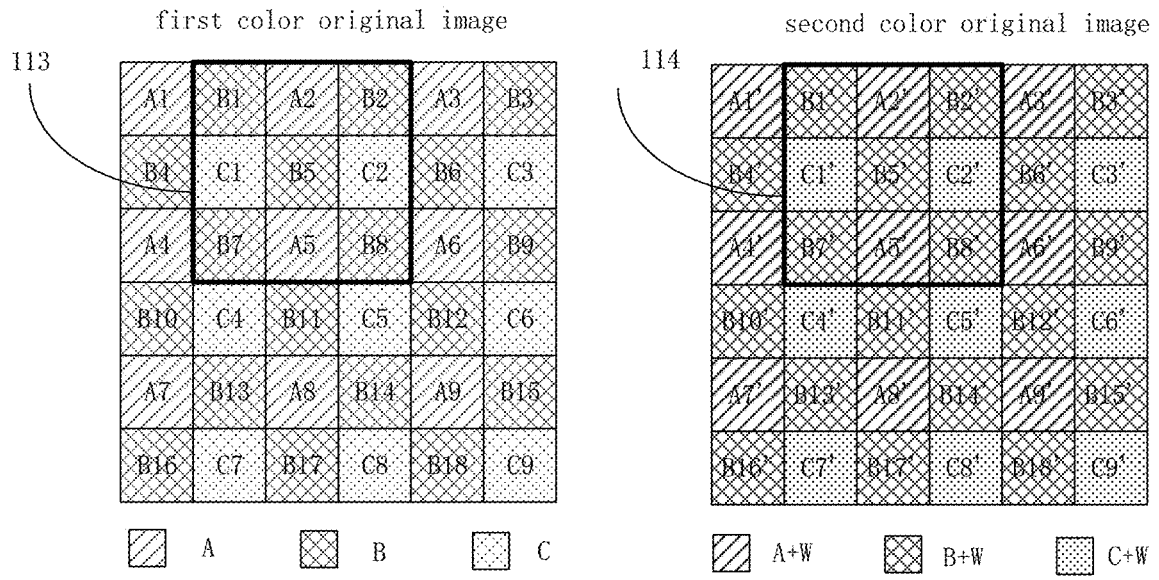

Referring to FIGS. 1 and 18, in another example, the processor 20 may determine a first to-be-filtered pixel (e.g., B5) in the first color original image, and determine a second to-be-filtered pixel (e.g., B5') in the second color original image. Specifically, a position of the first to-be-filtered pixel in the first color original image corresponds to a position of the second to-be-filtered pixel in the second color original image. The processor 20 may determine, according to the first to-be-filtered pixel, the first reference area 113 in the first color original image, and determine, according to the second to-be-filtered pixel, the second reference area 114 in the second color original image. Specifically, the first to-be-filtered pixel is located in the first reference area, the second to-be-filtered pixel is located in the second reference area, and the size of the first reference area and the size of the second reference may be the same (as illustrated in FIG. 18), or be different (not illustrated). And then, the processor 20 may calculate a weight in a spatial domain, i.e., a spatial-domain weight, for each of multiple first reference pixels (e.g., B1, B2, B5, B7 and B8) in the first reference area 113 relative to the first to-be-filtered pixel, and calculate a weight in a range domain, i.e., a range-domain weight, for each of multiple second reference pixels (e.g., B1', B2', B5', B7' and B8') in the second reference area 114 relative to the second to-be-filtered pixel. Specifically, the multiple first reference pixels and the multiple second reference pixels have the same color channel as the first to-be-filtered pixel. Subsequently, the processor 20 may correct the first color original image data of the first to-be-filtered pixel, based on the multiple pieces of first color original image data of the multiple first reference pixels, the weights in the spatial domain for the multiple first reference pixel relative to the first to-be-filtered pixel, and the weights in the range domain for the multiple second reference pixels relative to the second to-be-filtered pixel, thereby acquiring one of the multiple pieces of first color filtered image data. The processor 20 may traverse each pixel in the first color original image to acquire the multiple pieces of first color filtered image data. In other words, the processor 20 may determine each pixel in the first color original image as the first to-be-filtered pixel and filter each pixel in a manner of the embodiments illustrated in FIG. 18, thereby acquiring the first color filtered image data corresponding to the pixel. After acquiring the first color filtered image data, the multiple pieces of first color filtered image data may form the first filtered image.

In other examples, the Gaussian filtering may be used to filter the image. The Gaussian filtering differs from the embodiments illustrated in FIGS. 17 and 18 in that the filtering process of the first to-be-filtered pixel uses only the weight in the spatial domain for the first reference pixel relative to the first to-be-filtered pixel, and the Gaussian filtering does not require the weight in the range domain weight for the first reference pixel relative to the first to-be-filtered pixel, nor the weight in the range domain weight for the second reference pixel relative to the second to-be-filtered pixel.

Referring to FIG. 1, for example, the processor 20 may filter the second color original image to acquire the second color filtered image, like the embodiments illustrated in FIG. 17. Specifically, the processor 20 may determine the second to-be-filtered pixel in the second color original image, and determine, according to the second to-be-filtered pixel, the second reference area in the second color original image. Specifically, the second to-be-filtered pixel is located in the second reference area. And then, the processor 20 may calculate, for each of the multiple second reference pixels in the second reference area, a weight for the second reference pixel relative to the second to-be-filtered pixel. Specifically, the multiple second reference pixels have the same color channel as the second to-be-filtered pixel, and the weight includes a weight in the spatial domain and a weight in the range domain. And then, the processor may correct, according to the multiple pieces of second color original image data of the multiple second reference pixels and the weights for the multiple second reference pixels, the second color original image data of the second to-be-filtered pixel to acquire one of the multiple pieces of second color filtered image data. And then, the processor 20 may traverse each pixel in the second color original image to acquire the multiple pieces of second color filtered image data. Specific process performed by processor 20 to process the second color original image to obtain the second color filtered image is similar to the process of the embodiments illustrated in FIG. 17. Details are not be described here.

Referring to FIG. 1, in another example, the processor may filter the second color original image to obtain the second color filtered image, like the embodiments illustrated in FIG. 20. Specifically, the processor 20 may determine a first to-be-filtered pixel in the first color original image, and determine a second to-be-filtered pixel in the second color original image. Specifically, the position of the first to-be-filtered pixel in the first color original image corresponds to the position of the second to-be-filtered pixel in the second color original image. And then, the processor may determine, according to the first to-be-filtered pixel, a first reference area in the first color original image, and determine, according to the second to-be-filtered pixel, a second reference area in the second color original image. Specifically, the first to-be-filtered pixel is in the first reference area, the second to-be-filtered pixel is in the second reference area, and the sizes of the first reference area and the second reference area may be the same or different. And then, the processor 20 may calculate a weight in a spatial domain, a spatial-domain weight, for each of multiple second reference pixels in the second reference area relative to the second to-be-filtered pixel, and calculate a weight in a range domain, a range-domain weight, for each of multiple first reference pixels in the first reference area relative to the first to-be-filtered pixel. Specifically, the multiple first reference pixels and the multiple second reference pixels have the same color channel as the second to-be-filtered pixel. And then, the processor 20 may correct the second color original image data of the second to-be-filtered pixel, based on the multiple pieces of second color original image data of the multiple second reference pixels, the weights in the spatial domain for the multiple second reference pixels relative to the second to-be-filtered pixel, and the weights in the range domain for the multiple first reference pixels relative to the first to-be-filtered pixel, thereby acquiring one of the multiple pieces of second color filtered image data. And then, the processor 20 may traverse each pixel in the second color original image to acquire the multiple pieces of second color filtered image data. In other words, the processor 20 may determine each pixel in the second color original image as the second to-be-filtered pixel, and filter each pixel in a manner of the embodiments illustrated in FIG. 18, thereby acquiring the second color filtered image data corresponding to the pixel. After acquiring the multiple pieces of second color filtered image data, the multiple pieces of second color filtered image data compose the second color filtered image.

As such, by filtering the first color original image to acquire the first color filtered image, a flat area in the first color original image can be smoothed, the contrast between a contour area and the flat area in the first color filtered image can be obvious, and the image quality of the first color filtered image can be improved.

Referring to FIGS. 1 and 19, after acquiring the first color filtered image and the second color filtered image, the processor 20 may fuse the first color filtered image and the second color filtered image to acquire the target image. The processor 20 may first determine a first to-be-fused pixel in the first color filtered image and a second to-be-fused pixel in the second color filtered image. Specifically, the position of the first to-be-fused pixel in the first color filtered image corresponds to the position of the second to-be-fused pixel in the second color filtered image. Subsequently, the processor 20 may determine, based on the first to-be-fused pixel and the second to-be-fused pixel, a first selected area 115 in the first color filtered image and a second selected area 117 in the second color filtered image. Specifically, the first to-be-fused pixel is located in the first selected area 115, and the second to-be fused pixel is located in the second selected area 117. And then, the processor 20 may calculate a weighted sum of the multiple pieces of first color filtered image data of the multiple first selected pixels in the first selected area 115 to acquire the first color fused image data, and calculate a weighted sum of the second color filtered image data of the multiple second selected pixels in the second selected area to acquire a second color fused image data. Specifically, the multiple first selected pixels have the same color channel as the first to-be-fused pixel, and the multiple second selected pixels have the same color channel as the second to-be-fused pixel. And then, the processor 20 may calculate a piece of color target image data of the first to-be-fused pixel, according to the second color filtered image of the second to-be-fused pixel, the first color fused image data, and the second color fused image data. And then, the processor 20 may traverse each pixel in the first color filtered image to acquire multiple pieces of the color target image data, in which the multiple pieces of color target image data compose the target image.

Referring to FIGS. 1 and 19, specifically, the processor 20 may determine a first to-be-fused pixel B5 in the first color filtered image and a second to-be-fused pixel B5' in the second color filtered image. Specifically, the position of the first to-be-fused pixel B5 in the first color filtered image corresponds to the position of the second to-be-fused pixel B5' in the second color filtered image. And then, the processor 20 determines, according to the first to-be-fused pixel B5, a first selected area 115 of size 3×3 in the first color filtered image, and determines a second selected area 117 of size 3×3 in the second color filtered image. Specifically, the first to-be-fused pixel B5 is located in the first selected area 115, the second to-be-fused pixel B5' is located in the second selected area 117, the first selected pixels in the first selected area 115 include B1, B2, B5, B7 and B8, and the second selected pixels in the first selected area 115 include B1', B2', B5', B7' and B8'. It should be noted that, the first to-be-fused pixel B5 may be located at any position in the first selected area 115, and the second to-be-fused pixel B5' may be located at any position in the second selected area 117, provided that the position of the first to-be-fused pixel B5 corresponds to the position of the second to-be-fused pixel B5'. The first selected area 115 and the second selected area 117 may be in the same or different size. The shape of the window formed by the first selected area 115 and the second selected area 117 may be a square, or other shapes such as a rectangle, which is not limited thereto. The size of the first selected area 115 and the second selected area 117 may be 3×3, 4×4, 5×5, 3×5, 5×7, 9×5, etc., which is also not limited thereto. And then, the processor 20 may calculate a weighted sum of the multiple pieces of first color filtered image data of the multiple first selected pixels, i.e., B1, B2, B5, B7 and B8, in the first selected area based on the equation $B\_mean = \sum_{n=1}^{5} \alpha_n B_n$, where $\Sigma \alpha_n = 1$, $\alpha_n$ represents the weight of each of the multiple first selected pixels in the first selected area 115 relative to the first to-be-fused pixel B5, $B_n$ represents the first color filtered image data (may also be understood as a pixel value after the filtering) of each of the multiple first selected pixels, B_mean represents the weighted sum, i.e., the first color fused image data. The processor 20 may calculate a weighted sum of the second color filtered image data of the multiple second selected pixels, i.e., B1', B2', B5', B7' and B8', in the second selected area, based on the equation $B'\_mean = \sum_{n=1}^{5} \alpha_n B'_n$, where $\Sigma \alpha_n = 1$, $\alpha_n$ represents the weight of each of the multiple second selected pixels in the second selected area 117 relative to the second to-be-fused pixel, $B_n'$ represents the second color filtered image data (may also be understood as a pixel value after the filtering) of each of the multiple second selected pixels, B'_mean represents the weighted sum, i.e., the second color fused image data. And then, the processor 20 may calculate a piece of color target image data B5_output of the first to-be-fused pixel B5 based on the equation B5_output=B_mean*(B5'/B_mean). And then, the processor 20 may determine each pixel in the first color filtered image as the first to-be-fused pixel, determine each pixel in the second color filtered image as the second to-be-fused pixel, and fuse, according to the manner of embodiments illustrated in FIG. 19, the first to-be-fused pixel and the second to-be-fused pixel to acquire the color target image data corresponding to each the first to-be-fused pixel, in which the multiple pieces of the color target image data may compose the target image.

It should be noted that, the weight for each first selected pixel in the first selected area 115 relative to the first to-be-fused pixel B5 may include a weight in the spatial domain and a weight in the range domain. The weight in the spatial domain may be calculated based on the weight function $f(\|p-q\|)$, and the weight in the range domain may be calculated based on the weight function $g(\|\tilde{I}_p - \tilde{I}_q\|)$. Similarly, the weight for each second selected pixel in the second selected area 117 relative to the second to-be-fused pixel may also include a weight in the spatial domain and a weight in the range domain. The weight in the spatial domain may be calculated based on the weight function $f(\|p-q\|)$, and the weight in the range domain may be calculated based on the weight function $g(\|\tilde{I}_p - \tilde{I}_q\|)$.

Furthermore, for example, the processor 20 may perform interpolation on the target image so that each pixel in an interpolated target image has values for multiple color channels (i.e., a color channel A, a color channel B, and a color channel C). Specifically, the processor may be an image signal processor (ISP). In another example, the processor 20 and the ISP are two different processors, and the processor 20 may transmit the target image to the ISP, so as to enable the ISP processor to perform the interpolation on the target image to obtain the interpolated target image.

In some embodiments, after acquiring the first color original image and the second color original image, the image sensor 10 may transmit these two original images to the processor 20, the processor 20 may fuse the first color original image and the second color original image directly to obtain the target image without filtering the two original images in the manner of the embodiments illustrated in FIG. 19.

It can be understood that, the second color original image data of the second color original image is obtained by calculating the sum or the average of the electrical signals generated by the transparent photosensitive pixel W and the color photosensitive pixel. The electrical signal generated by using the transparent photosensitive pixel W enables the second color original image with high signal-to-noise ratio, and enables the second color original image with high definition. In the embodiments of the disclosure, the first color original image and the second color original image are fused, so that the first color original image can inherit the signal-to-noise ratio and definition of the second color original image, and thus the quality of the image taken in the dark environment can be improved.

Based on the above, the camera assembly 100 according to the embodiments of the disclosure acquires the first color original image including only the image data of the monochromatic color channel, and the second color original image including image data of both the monochromatic color channel and a panchromatic color channel. The camera assembly 100 fuse the first color original image and the second color original image. By using the image data of the panchromatic color channel, the signal-to-noise ratio and definition of the image can be improved, and thereby improving the quality of the image taken in the dark environment. In addition, by filtering the first color original image and the second color original image, the flat area in the obtained target image can be smooth and the contrast between contour area and flat area can be obvious, which improves the quality of the target image.

Referring to FIG. 20, the disclosure further provides a mobile terminal 300. The mobile terminal 300 includes the camera assembly 100 described in any one of the foregoing embodiments and a housing 200. The camera assembly 100 is combined with the housing 200.

The mobile terminal 300 may be a mobile phone, a tablet computer, a notebook computer, a smart wearable device (e.g., a smart watch, a smart bracelet, smart glasses, a smart helmet), a drone, a head-mounted display device, etc., which is not limited thereto.

The mobile terminal 300 according to embodiments of the disclosure obtains, by exposing the pixel array 11, the first color original image including image data of only a monochromatic color channel and the second color original image including image data of both the monochromatic color channel and a panchromatic color channel, and fuses the first color original image and the second color original image to improve the signal-to-noise ratio and the clarity of the image by using the image data of the transparent channel, so that the quality of the image taken in the dark environment can be improved.

Referring to FIGS. 1, 2, 5 and 21, the disclosure further provides an image acquisition method that may be applied to the image sensor 10 described in any one of the above embodiments. The image acquisition method includes operations as follows.

At 01: exposing a pixel array 11 to acquire a first color original image and a second color original image, where the first color original image is composed of multiple pieces of first color original image data, each of the multiple pieces of first color original image data is generated by the at least one color photosensitive pixel of the sub-unit, the second color original image is composed of multiple pieces of second color original image data, and each of the multiple pieces of second color original image data is generated by the at least one transparent photosensitive pixel W and the at least one color photosensitive pixel of the sub-unit.

At 02, fusing the first color original image and the second color original image to acquire a target image.

In the above embodiments, the acquisition method further includes:

filtering the first color original image to acquire a first color filtered image, in which the first color filtered image is composed of multiple pieces of first color filtered image data; and filtering the second color original image to acquire a second color filtered image, in which the second color filtered image is composed of multiple pieces of second color filtered image data;

The operation 02 of the fusing the first color original image and the second color original image to acquire a target image, includes:

fusing the first color filtered image and the second color filtered image to acquire the target image.

Referring to FIG. 17, in some embodiments, the operation of filtering the first color original image to acquire a first color filtered image, includes:

determining a first to-be-filtered pixel in the first color filtered image;

determining a first reference area 113 in the first color image, in which the first to-be-filtered pixel is located in the first reference area 113;

calculating, for each of multiple first reference pixels in the first reference area 113, a weight of the first reference pixel relative to the first to-be-filtered pixel, in which the multiple first reference pixels have a same color channel as the first to-be-filtered pixel, and the weight includes a weight in a spatial domain and a weight in a range domain;

correcting, according to the first color original image data of the multiple first reference pixels and the weights for the multiple first reference pixels, the first color original image data of the first to-be-filtered pixel to acquire one of the multiple pieces first color filtered image data; and traversing each pixel in the first color original image to acquire the multiple pieces of first color filtered image data.

In some embodiments, the operation of filtering the second color original image to obtain a second color filtered image, includes:

determining a second to-be-filtered pixel in the second color filtered image;

determining a second reference area in the second color image, in which the second to-be-filtered pixel is located in the second reference area;

calculating, for each of multiple second reference pixels in the second reference area, a weight for the second reference pixel relative to the second to-be-filtered pixel, in which the multiple second reference pixels have a same color channel as the second to-be-filtered pixel, and the weight includes a weight in a spatial domain and a weight in a range domain;

correcting, according to the second color original image data of the multiple second reference pixels and the weights for the multiple second reference pixels, the second color original image data of the second to-be-filtered pixel to acquire one of the multiple pieces of second color filtered image data; and traversing each pixel in the second color original image to acquire the multiple pieces of second color filtered image data.

Referring to FIG. 19, in some embodiments, the operation of fusing the first color filtered image and the second color filtered image to acquire the target, includes:

determining a first to-be-fused pixel in the first color filtered image and a second to-be-fused pixel in the second color filtered image, in which a position of the first to-be-fused pixel in the first color filtered image corresponds to a position of the second to-be-fused pixel in the second color filtered image;

determining a first selected area 115 in the first color filtered image and a second selected area 117 in the second color filtered image, in which the first to-befused pixel is located in the first selected area 115, and the second to-be fused pixel is located in the second selected area 117;

calculating a weighted sum of the multiple pieces of first color filtered image data of multiple first selected pixels in the first selected area 115 to acquire first color fused image data, and calculating a weighted sum of the multiple pieces of second color filtered image data of multiple second selected pixels in the second selected area 117 to acquire second color fused image data, in which the multiple first selected pixels have a same color channel as the first to-be-fused pixel, and the multiple second selected pixels have a same color channel as the second to-be-fused pixel;

calculating a piece of color target image data of the first to-be-fused pixel, according to the second color filtered image data, the first color fused image data, and the second color fused image data of the second to-be-fused pixel; and traversing each pixel in the first color filtered image to acquire multiple pieces of the color target image data, in which the multiple pieces of color target image data compose the target image.

Referring to FIG. 13, in some embodiments, when each of the multiple the sub-unit includes one the color photosensitive pixel, an electrical signal generated by the color photosensitive pixel after receiving light is taken as a piece of the first color original image data.

Referring to FIG. 5, in some embodiments, when each of the multiple the sub-unit includes multiple the color photosensitive pixels, a sum or an average of multiple electrical signals generated by the multiple color photosensitive pixels after receiving light is taken as a piece of the first color original image data;

Referring to FIG. 14, in some embodiments, when each sub-unit includes one the transparent photosensitive pixel W, a sum or an average of an electrical signal generated by the transparent photosensitive pixel W after receiving light and all electrical signal generated by all the color photosensitive pixel in the sub-unit after receiving light is taken as a piece of the second color original image data.

Referring to FIG. 5, in some embodiments, when each sub-unit includes multiple the transparent photosensitive pixel W, a sum or an average of multiple electrical signals generated by the multiple transparent photosensitive pixels W after receiving light and all electrical signal generated by all the color photosensitive pixel in the sub-unit after receiving light is taken as a piece of the second color original image data.

Specific implementation process of the image acquisition method described in any one of the above implementation manners is the same as the specific implementation process described above for acquiring the target image by the camera assembly 100 (illustrated in FIG. 1). Details will not be described herein.

In the description of the specification, the terms "one embodiment", "some embodiments", "an exemplary embodiment", "an example", "a specific example", or "some examples" or the like mean that specific features, structures, materials or characteristics described in combination with the embodiment or example are included in at least one embodiment or example of the disclosure. In the specification, demonstrative expressions of the terms may not refer to the same embodiment or example. Moreover, the specific features, structures, materials or characteristics as described may be combined in a suitable manner in any one or more embodiments or examples. In addition, without contradicting each other, those skilled in the art may combine the different embodiments or examples described in this specification and the features of the different embodiments or examples.

Any process or method described in the flowchart or otherwise described herein may be understood to represent a module, fragment or portion of code including one or more executable instructions for implementing steps of a particular logical function or process, and the scope of the preferred embodiments of the present disclosure includes additional implementations in which the functions may be performed not in the order shown or discussed, including in a substantially simultaneous manner or in the reverse order, depending on the function involved, as should be understood by those skilled in the art to which the embodiments of the present disclosure belong.

Although the embodiments of the disclosure have been shown and described in the above, it should be understood that the above embodiments are exemplary and should not be construed as limiting the disclosure. Changes, modifications, substitutions and alterations can be made to the above embodiments within the scope of the disclosure by those skilled in the art.

What is claimed is:

1. An image acquisition method, performed by an image sensor, wherein the image sensor comprises a pixel array including a plurality of sub-units, each of the plurality of sub-units comprises at least one transparent photosensitive pixel and at least one color photosensitive pixel, and the at least one color photosensitive pixel has a narrower spectral response range than the at least one transparent photosensitive pixel; wherein the image acquisition method comprises:

acquiring a first color original image and a second color original image by exposing the pixel array, wherein the first color original image is composed of a plurality pieces of first color original image data, each of the plurality pieces of first color original image data is generated by the at least one color photosensitive pixel of the sub-unit, the second color original image is composed of a plurality pieces of second color original image data, and each of the plurality pieces of second color original image data is generated by the at least one transparent photosensitive pixel and the at least one color photosensitive pixel of the sub-unit; and fusing the first color original image and the second color original image to acquire a target image.

2. The image acquisition method as claimed in claim 1, further comprising:

filtering the first color original image to acquire a first color filtered image, wherein the first color filtered image is composed of a plurality pieces of first color filtered image data; and filtering the second color original image to acquire a second color filtered image, wherein the second color filtered image is composed of a plurality pieces of second color filtered image data;

wherein fusing the first color original image and the second color original image to acquire the target image, comprises:

fusing the first color filtered image and the second color filtered image to acquire the target image.

3. The image acquisition method as claimed in claim 2, wherein filtering the first color original image to acquire the first color filtered image, comprises:

determining a first to-be-filtered pixel in the first color original image;

determining a first reference area in the first color original image, wherein the first to-be-filtered pixel is located in the first reference area;

calculating, for each of a plurality of first reference pixels in the first reference area, a weight for the first reference pixel relative to the first to-be-filtered pixel, wherein the plurality of first reference pixels have a same color channel as the first to-be-filtered pixel, and the weight comprises a weight in a spatial domain and a weight in a range domain;

correcting, according to the plurality pieces of first color original image data of the plurality of first reference pixels and the weights for the plurality of first reference pixels, the first color original image data of the first to-be-filtered pixel to acquire one of the plurality pieces of first color filtered image data; and traversing each pixel in the first color original image to acquire the plurality pieces of first color filtered image data.

4. The image acquisition method as claimed in claim 2, wherein filtering the second color original image to acquire the second color filtered image, comprises:

determining a second to-be-filtered pixel in the second color original image;

determining a second reference area in the second color original image, wherein the second to-be-filtered pixel is located in the second reference area;

calculating, for each of a plurality of second reference pixels in the second reference area, a weight for the second reference pixel relative to the second to-be-filtered pixel, wherein the plurality of second reference pixels have a same color channel as the second to-be-filtered pixel, and the weight comprises a weight in a spatial domain and a weight in a range domain;

correcting, according to the plurality pieces of second color original image data of the plurality of second reference pixels and the weights for the plurality of second reference pixels, the second color original image data of the second to-be-filtered pixel to acquire one of the plurality pieces of second color filtered image data; and traversing each pixel in the second color original image to acquire the plurality pieces of second color filtered image data.

5. The image acquisition method as claimed in claim 2, wherein fusing the first color filtered image and the second color filtered image to acquire the target image, comprises:

determining a first to-be-fused pixel in the first color filtered image and a second to-be-fused pixel in the second color filtered image, wherein a position of the first to-be-fused pixel in the first color filtered image corresponds to a position of the second to-be-fused pixel in the second color filtered image;

determining a first selected area in the first color filtered image and a second selected area in the second color filtered image, wherein the first to-be-fused pixel is located in the first selected area, and the second to-be-fused pixel is located in the second selected area;

calculating a weighted sum of the plurality pieces of first color filtered image data of a plurality of first selected pixels in the first selected area to acquire first color fused image data, and calculating a weighted sum of the plurality of second color filtered image data of a plurality of second selected pixels in the second selected area to acquire second color fused image data, wherein the plurality of first selected pixels have a same color channel as the first to-be-fused pixel, and the plurality of second selected pixels have a same color channel as the second to-be-fused pixel;

calculating, according to the second color filtered image data, the first color fused image data, and the second color fused image data of the second to-be-fused pixel, a piece of color target image data of the first to-be-fused pixel; and traversing each pixel in the first color filtered image to acquire a plurality pieces of the color target image data, wherein the plurality pieces of the color target image data compose the target image.

6. The image acquisition method as claimed in claim 2, wherein filtering the first color original image to acquire the first color filtered image, comprises:

determining a first to-be-filtered pixel in the first color original image and a second to-be-filtered pixel in the second color original image, wherein a position of the first to-be-filtered pixel in the first color filtered image corresponds to a position of the second to-be-filtered pixel in the second color filtered image;

determining a first reference area in the first color original image and a second reference area in the second color original image, wherein the first to-be-filtered pixel is located in the first reference area, and the second to-be-filtered pixel is located in the second reference area;

calculating, for each of a plurality of first reference pixels in the first reference area, a spatial-domain weight for the first reference pixel relative to the first to-be-filtered pixel, and calculating, for each of a plurality of second reference pixels in the second reference area, a range-domain weight for the second reference pixel relative to the second to-be-filtered pixel;

correcting the first color original image data of the first to-be-filtered pixel to acquire one of the plurality pieces of first color filtered image data, according to the plurality pieces of first color original image data of the plurality of first reference pixels, the spatial-domain weights for the plurality of first reference pixels, the range-domain weights for the plurality of second reference pixels; and traversing each pixel in the first color original image to acquire the plurality pieces of first color filtered image data.

7. The image acquisition method as claimed in claim 2, wherein filtering the second color original image to acquire the second color filtered image, comprises:

determining a first to-be-filtered pixel in the first color original image and a second to-be-filtered pixel in the second color original image, wherein a position of the first to-be-filtered pixel in the first color filtered image corresponds to a position of the second to-be-filtered pixel in the second color filtered image;

determining a first reference area in the first color original image and a second reference area in the second color original image, wherein the first to-be-filtered pixel is located in the first reference area, and the second to-be-filtered pixel is located in the second reference area;

calculating, for each of a plurality of first reference pixels in the first reference area, a range-domain weight for the first reference pixel relative to the first to-be-filtered pixel, and calculating, for each of a plurality of second reference pixels in the second reference area, a spatial-domain weight for the second reference pixel relative to the second to-be-filtered pixel;

correcting the second color original image data of the second to-be-filtered pixel to acquire one of the plurality pieces of second color filtered image data, according to the plurality pieces of second color original image data of the plurality of second reference pixels, the range-domain weights for the plurality of first reference pixels, the spatial-domain weights for the plurality of second reference pixels; and traversing each pixel in the second color original image to acquire the plurality pieces of second color filtered image data.

8. The image acquisition method as claimed in claim 1, wherein when the at least one color photosensitive pixel in each of the plurality of sub-units comprises one color photosensitive pixel, an electrical signal generated by the color photosensitive pixel after receiving light is taken as a piece of the first color original image data;

when the at least one color photosensitive pixel in each of the plurality of sub-units comprises a plurality of color photosensitive pixels, a sum or an average of a plurality of electrical signals generated by the plurality of color photosensitive pixels after receiving light is taken as a piece of the first color original image data;

when the at least one transparent photosensitive pixel in each of the plurality of sub-units comprises one transparent photosensitive pixel, a sum or an average of an electrical signal generated by the transparent photosensitive pixel after receiving light and all electrical signal generated by all of the at least one color photosensitive pixel in the sub-unit after receiving light is taken as a piece of the second color original image data; and when the at least one transparent photosensitive pixel in each of the plurality of sub-units comprises a plurality of transparent photosensitive pixels, a sum or an average of a plurality of electrical signals generated by the plurality of transparent photosensitive pixels after receiving light and all electrical signal generated by all of the at least one color photosensitive pixel in the sub-unit is taken as a piece of the second color original image data.

9. A camera assembly, comprising:

an image sensor, wherein the image sensor comprises a pixel array including a plurality of sub-units, each of the plurality of sub-units comprises at least one transparent photosensitive pixel and at least one color photosensitive pixel, and the at least one color photosensitive pixel has a narrower spectral response range than the at least one transparent photosensitive pixel; a first color original image and a second color original image are acquired by exposing the pixel array, the first color original image is composed of a plurality pieces of first color original image data, each of the plurality pieces of first color original image data is generated by the at least one color photosensitive pixel of the sub-unit, the second color original image is composed of a plurality pieces of second color original image data, and each of the plurality pieces of second color original image data is generated by the at least one transparent photosensitive pixel and the at least one color photosensitive pixel of the sub-unit; and a processor, configured to fuse the first color original image and the second color original image to thereby acquire a target image.

10. The camera assembly as claimed in claim 9, the processor being further configured to:

filter the first color original image to acquire a first color filtered image, wherein the first color filtered image is composed of a plurality pieces of first color filtered image data;

filter the second color original image to acquire a second color filtered image, wherein the second color filtered image is composed of a plurality pieces of second color filtered image data; and fuse the first color filtered image and the second color filtered image to acquire the target image.

11. The camera assembly as claimed in claim 10, the processor being further configured to:

determine a first to-be-filtered pixel in the first color original image;

determine a first reference area in the first color original image, wherein the first to-be-filtered pixel is located in the first reference area;

calculate, for each of a plurality of first reference pixels in the first reference area, a weight for the first reference pixel relative to the first to-be-filtered pixel, wherein the plurality of first reference pixels have a same color channel as the first to-be-filtered pixel, and the weight comprises a weight in a spatial domain and a weight in a range domain;

correct, according to the plurality pieces of first color original image data of the plurality of first reference pixels and the weights for the plurality of first reference pixels, the first color original image data of the first to-be-filtered pixel to acquire one of the plurality pieces of first color filtered image data; and traverse each pixel in the first color original image to acquire the plurality pieces of first color filtered image data.

12. The camera assembly as claimed in claim 10, the processor being further configured to:

determine a second to-be-filtered pixel in the second color original image;

determine a second reference area in the second color original image, wherein the second to-be-filtered pixel is located in the second reference area;

calculate, for each of a plurality of second reference pixels in the second reference area, a weight for the second reference pixel relative to the second to-be-filtered pixel, wherein the plurality of second reference pixels have a same color channel as the second to-be-filtered pixel, and the weight comprises a weight in a spatial domain and a weight in a range domain;

correct, according to the plurality pieces of second color original image data of the plurality of second reference pixels and the weights for the plurality of second reference pixels, the second color original image data of the second to-be-filtered pixel to acquire one of the plurality pieces of second color filtered image data; and traverse each pixel in the second color original image to acquire the plurality pieces of second color filtered image data.

13. The camera assembly as claimed in claim 10, the processor being further configured to:

determine a first to-be-fused pixel in the first color filtered image and a second to-be-fused pixel in the second color filtered image, wherein a position of the first to-be-fused pixel in the first color filtered image corresponds to a position of the second to-be-fused pixel in the second color filtered image;

determine a first selected area in the first color filtered image and a second selected area in the second color filtered image, wherein the first to-be-fused pixel is located in the first selected area, and the second to-be-fused pixel is located in the second selected area;

calculate a weighted sum of the plurality pieces of first color filtered image data of a plurality of first selected pixels in the first selected area to acquire first color fused image data, and calculate a weighted sum of the plurality of second color filtered image data of a plurality of second selected pixels in the second selected area to acquire second color fused image data, wherein the plurality of first selected pixels have a same color channel as the first to-be-fused pixel, and the plurality of second selected pixels have a same color channel as the second to-be-fused pixel;

calculate, according to the second color filtered image data, the first color fused image data, and the second color fused image data of the second to-be-fused pixel, a piece of color target image data of the first to-be-fused pixel; and traverse each pixel in the first color filtered image to acquire a plurality pieces of the color target image data, wherein the plurality pieces of the color target image data compose the target image.

14. The camera assembly as claimed in claim 9, wherein when the at least one color photosensitive pixel in each of the plurality of sub-units comprises one color photosensitive pixel, an electrical signal generated by the color photosensitive pixel after receiving light is taken as a piece of the first color original image data;

when the at least one color photosensitive pixel in each of the plurality of sub-units comprises a plurality of color photosensitive pixels, a sum or an average of a plurality of electrical signals generated by the plurality of color photosensitive pixels after receiving light is taken as a piece of the first color original image data;

when the at least one transparent photosensitive pixel in each of the plurality of sub-units comprises one transparent photosensitive pixel, a sum or an average of an electrical signal generated by the transparent photosensitive pixel after receiving light and all electrical signal generated by all of the at least one color photosensitive pixel in the sub-unit after receiving light is taken as a piece of the second color original image data; and when the at least one transparent photosensitive pixel in each of the plurality of sub-units comprises a plurality of transparent photosensitive pixels, a sum or average of a plurality of electrical signals generated by the plurality of transparent photosensitive pixels after receiving light and all electrical signal generated by all of the at least one color photosensitive pixel in the sub-unit is taken as a piece of the second color original image data.

15. The camera assembly as claimed in claim 9, wherein in each of the plurality of sub-units, the at least one transparent photosensitive pixel and the at least one color photosensitive pixel are arranged alternately; or in each of the plurality of sub-units, a plurality of photosensitive pixels in a same row have a same color channel; or in each of the plurality of sub-units, a plurality of photosensitive pixels in a same column have a same color channel.

16. A mobile terminal, comprising:
a housing; and
a camera assembly combined with the housing, wherein the camera assembly comprises:
an image sensor, wherein the image sensor comprises a pixel array including a plurality of sub-units, each of the plurality of sub-units comprises at least one transparent photosensitive pixel and at least one color photosensitive pixel, and the at least one color photosensitive pixel has a narrower spectral response range than the at least one transparent photosensitive pixel; a first color original image and a second color original image are acquired by exposing the pixel array, the first color original image is composed of a plurality pieces of first color original image data, each of the plurality pieces of first color original image data is generated by the at least one color photosensitive pixel of the sub-unit, the second color original image is composed of a plurality pieces of second color original image data, and each of the plurality pieces of second color original image data is generated by the at least one transparent photosensitive pixel and the at least one color photosensitive pixel of the sub-unit; and
a processor, configured to fuse the first color original image and the second color original image to thereby acquire a target image.

17. The mobile terminal as claimed in claim 16, the processor being further configured to:
filter the first color original image to acquire a first color filtered image, wherein the first color filtered image is composed of a plurality pieces of first color filtered image data;
filter the second color original image to acquire a second color filtered image, wherein the second color filtered image is composed of a plurality pieces of second color filtered image data; and
fuse the first color filtered image and the second color filtered image to acquire the target image.

18. The mobile terminal as claimed in claim 17, the processor being further configured to:
determine a first to-be-filtered pixel in the first color original image;
determine a first reference area in the first color original image, wherein the first to-be-filtered pixel is located in the first reference area;
calculate, for each of a plurality of first reference pixels in the first reference area, a weight for the first reference pixel relative to the first to-be-filtered pixel, wherein the plurality of first reference pixels have a same color channel as the first to-be-filtered pixel, and the weight comprises a weight in a spatial domain and a weight in a range domain;
correct, according to the plurality pieces of first color original image data of the plurality of first reference pixels and the weights for the plurality of first reference pixels, the first color original image data of the first to-be-filtered pixel to acquire one of the plurality pieces of first color filtered image data;
traverse each pixel in the first color original image to acquire the plurality pieces of first color filtered image data;
determine a second to-be-filtered pixel in the second color original image;
determine a second reference area in the second color original image, wherein the second to-be-filtered pixel is located in the second reference area;

calculate, for each of a plurality of second reference pixels in the second reference area, a weight for the second reference pixel relative to the second to-be-filtered pixel, wherein the plurality of second reference pixels have a same color channel as the second to-be-filtered pixel, and the weight comprises a weight in a spatial domain and a weight in a range domain;

correct, according to the plurality pieces of second color original image data of the plurality of second reference pixels and the weights for the plurality of second reference pixels, the second color original image data of the second to-be-filtered pixel to acquire one of the plurality pieces of second color filtered image data; and traverse each pixel in the second color original image to acquire the plurality pieces of second color filtered image data.

19. The mobile terminal as claimed in claim 17, the processor being further configured to:

determine a first to-be-fused pixel in the first color filtered image and a second to-be-fused pixel in the second color filtered image, wherein a position of the first to-be-fused pixel in the first color filtered image corresponds to a position of the second to-be-fused pixel in the second color filtered image;

determine a first selected area in the first color filtered image and a second selected area in the second color filtered image, wherein the first to-be-fused pixel is located in the first selected area, and the second to-be-fused pixel is located in the second selected area;

calculate a weighted sum of the plurality pieces of first color filtered image data of a plurality of first selected pixels in the first selected area to acquire first color fused image data, and calculate a weighted sum of the plurality of second color filtered image data of a plurality of second selected pixels in the second selected area to acquire second color fused image data, wherein the plurality of first selected pixels have a same color channel as the first to-be-fused pixel, and the plurality of second selected pixels have a same color channel as the second to-be-fused pixel;

calculate, according to the second color filtered image data, the first color fused image data, and the second color fused image data of the second to-be-fused pixel, a piece of color target image data of the first to-be-fused pixel; and traverse each pixel in the first color filtered image to acquire a plurality pieces of the color target image data, wherein the plurality pieces of the color target image data compose the target image.

20. The mobile terminal as claimed in claim 16, wherein when the at least one color photosensitive pixel in each of the plurality of sub-units comprises one color photosensitive pixel, an electrical signal generated by the color photosensitive pixel after receiving light is taken as a piece of the first color original image data;

when the at least one color photosensitive pixel in each of the plurality of sub-units comprises a plurality of color photosensitive pixels, a sum or an average of a plurality of electrical signals generated by the plurality of color photosensitive pixels after receiving light is taken as a piece of the first color original image data;

when the at least one transparent photosensitive pixel in each of the plurality of sub-units comprises one transparent photosensitive pixel, a sum or an average of an electrical signal generated by the transparent photosensitive pixel after receiving light and all electrical signal generated by all of the at least one color photosensitive pixel in the sub-unit after receiving light is taken as a piece of the second color original image data; and when the at least one transparent photosensitive pixel in each of the plurality of sub-units comprises a plurality of transparent photosensitive pixels, a sum or average of a plurality of electrical signals generated by the plurality of transparent photosensitive pixels after receiving light and all electrical signal generated by all of the at least one color photosensitive pixel in the sub-unit is taken as a piece of the second color original image data.

* * * * *